United States Patent [19]

Tsutsui et al.

[11] Patent Number: 5,525,689
[45] Date of Patent: Jun. 11, 1996

[54] PROCESS FOR PREPARING ETHYLENE COPOLYMERS

[75] Inventors: Toshiyuki Tsutsui; Ken Yoshitsugu; Akinori Toyota, all of Kuga-gun, Japan

[73] Assignee: Mitsui Petrochemical Industries, Ltd., Tokyo, Japan

[21] Appl. No.: 458,696

[22] Filed: Jun. 2, 1995

Related U.S. Application Data

[60] Continuation of Ser. No. 151,990, Nov. 15, 1993, abandoned, which is a division of Ser. No. 901,972, Jun. 22, 1992, Pat. No. 5,336,746, which is a division of Ser. No. 459,834, filed as PCT/JP89/01281, Dec. 21, 1989, abandoned.

[30] Foreign Application Priority Data

| Dec. 26, 1988 | [JP] | Japan | 328731 |
| Dec. 26, 1988 | [JP] | Japan | 328732 |
| Dec. 26, 1988 | [JP] | Japan | 328734 |
| Jan. 24, 1989 | [JP] | Japan | 14596 |
| Jul. 21, 1989 | [JP] | Japan | 189044 |

[51] Int. Cl.$^6$ .......................... C08F 4/643; C08F 210/14
[52] U.S. Cl. .......................... 526/160; 526/127; 526/128; 526/165; 526/348; 526/348.2
[58] Field of Search .................. 526/129, 160, 526/165, 127, 128

[56] References Cited

U.S. PATENT DOCUMENTS

| 4,256,784 | 3/1981 | Gebhardt et al. . | |
| 4,367,322 | 1/1983 | Shiga et al. . | |
| 4,761,462 | 8/1988 | Kitamura et al. . | |
| 4,794,096 | 12/1988 | Ewen . | |
| 4,808,561 | 2/1989 | Welborn, Jr. | 526/160 X |
| 4,857,611 | 8/1989 | Durand et al. . | |
| 4,863,769 | 9/1989 | Lustig et al. . | |
| 4,914,253 | 4/1990 | Chang . | |
| 4,925,902 | 5/1990 | Desvignes et al. . | |
| 4,931,517 | 6/1990 | Fujita | 526/160 X |

FOREIGN PATENT DOCUMENTS

| 109779 | 5/1984 | European Pat. Off. . |
| 123510 | 10/1984 | European Pat. Off. . |
| 141597 | 6/1985 | European Pat. Off. . |
| 232595 | 8/1987 | European Pat. Off. . |
| 260999 | 3/1988 | European Pat. Off. . |
| 263718 | 4/1988 | European Pat. Off. . |
| 283164 | 9/1988 | European Pat. Off. . |
| 284707 | 10/1988 | European Pat. Off. . |
| 0314797 | 5/1989 | European Pat. Off. . |
| 324856 | 7/1989 | European Pat. Off. . |
| 342091 | 11/1989 | European Pat. Off. . |
| 2346372 | 10/1977 | France . |
| 2637991 | 3/1978 | Germany . |
| 2637990 | 3/1978 | Germany . |
| 2121708 | 11/1985 | Japan . |
| 2052532 | 1/1981 | United Kingdom . |
| 8803932 | 6/1988 | WIPO . |
| 8808432 | 11/1988 | WIPO . |

OTHER PUBLICATIONS

Patent Abstracts of Japan, vol. 12, No. 444 (C–545) [3291], Nov. 22, 1988, JP 63–168407, (Showa), Jul. 12, 1988.
Patent Abstracts of Japan, vol. 12, No. 450 (C–547) [3297], Nov. 25, 1988, JP 63–175004, (Mitsui), Jul. 19, 1988.
Patent Abstracts of Japan, vol. 11, No. 349 (C–456) [2796], Nov. 14, 1987, JP 62–121707 (Mitsui), Jun. 3, 1987.
Patent Abstracts of Japan, vol. 11, No. 394 (C–465) [2841], Dec. 23, 1987, JP 62–153307 (Sumitomo), Jul. 8, 1987.
Patent Abstracts of Japan, vol. 11, No. 251 (C–440) [2698], Aug. 14, 1987, JP 62–57406 (Mitsui), Mar. 13, 1987.
Patent Abstracts of Japan, vol. 11, No. 349 (C–456) [2796], Nov. 14, 1987, JP 62–119212 (Mitsui), May 30, 1987.

*Primary Examiner*—Fred Teskin
*Attorney, Agent, or Firm*—Sherman and Shalloway

[57] ABSTRACT

In accordance with the present invention, there are provided ethylene copolymers composed of structural units (a) derived from ethylene and structural units (b) derived from α-olefin of 3~20 carbon atoms, said ethylene copolymers having

[A] density of 0.85~0.92 g/cm$^3$,

[B] an intrinsic viscosity [η] as measured in decalin at 135° C. of 0.1~10 dl/g,

[C] a ratio (Mw/Mn) of a weight average molecular weight (Mw) to a number average molecular weight (Mn) as measured by GPC of 1.2~4, and

[D] a ratio (MFR$_{10}$/MFR$_2$) of MFR$_{10}$ under a load of 10 kg to MFR$_2$ under a load of 2.16 kg at 190° C. of 8~50, and being narrow in molecular weight distribution and excellent in flowability.

11 Claims, 4 Drawing Sheets

FIG. 1

(A) Transition metal component

Hafnium compound having as a ligand a multidentate compound in which at least two groups selected from among conjugated cycloalkadienyl groups or substituted groups thereof are linked together via lower alkylene groups, or a treated product thereof.

(B) Organometallic component

Organoaluminum oxy-compound

Olefin copolymer

PROCESS FOR PREPARING ETHYLENE COPOLYMERS

This application is a continuation of application Ser. No. 08/151,990, filed Nov. 15, 1993, now abandoned, which is a division of Ser. No. 07/901,972 (U.S. Pat. No. 5,336,746, filed Jun. 22, 1992, which is a division of Ser. No. 07/459, 834 filed as PCT/JP89/01281, Dec. 21, 1989, now abandoned.

FIELD OF THE INVENTION

This invention relates to novel ethylene copolymers and a process for preparing the same and more particularly to novel ethylene copolymers excellent in flowability in spite of the fact that they are narrow in molecular weight distribution ($\overline{M}w/\overline{M}m$) in comparison with conventionally known ethylene copolymers, and to a process for preparing the same.

In a further aspect, the invention relates to novel propylene random copolymers and a process for preparing the same and more particularly to novel propylene random copolymers having low melting points in comparison with conventionally known propylene random copolymers and, in particular, excellent in heat-sealing properties and anti-block properties, and to a process for preparing the same.

In another aspect, the invention, relates to olefin polymerization catalysts capable of polymerizing olefins with excellent polymerization activity even when the amount of aluminoxane used is reduced and capable of giving olefin polymers having high molecular weights.

BACKGROUND OF THE INVENTION

When molded into articles such as film, copolymers of ethylene and α-olefins of 3 to 20 carbon atoms are found to have excellent mechanical strength such as tensile strength, tear strength or impact strength and also excellent heat resistance, stress crack resistance, optical characteristics and heat-sealing properties in comparison with conventional high-pressure low density polyethylenes, and are known as materials particularly useful for the preparation of inflation film or the like.

Generally speaking, the ethylene copolymers mentioned above have such excellent characteristics that when said copolymers come to be narrower in molecular weight distribution represented by the ratio ($\overline{M}w/\overline{M}n$) of weight average molecular weight ($\overline{M}w$) to number average molecular weight ($\overline{M}n$), the molded articles obtained therefrom, such as film, are found to be less tacky. However, when these ethylene copolymers having a narrow molecular weight distribution are melted, there were such drawbacks that their flowability represented by the ratio ($MFR_{10}/MFR_2$) of $MFR_{10}$ under a load of 10 kg to $MFR_2$ under a load of 2.16 kg as measured at 190° C. is small, with the result that they become poor in moldability.

Therefore, if ethylene copolymers which are small in value of $\overline{M}w/\overline{M}n$ and narrow in molecular weight distribution and, moreover, large in value of $MFR_{10}/MFR_2$ and excellent in flowability come to be obtained, such ethylene copolymers are certainly of great commercial value.

On the other land, polypropylene has wide applications in the field of plastics because of its excellent physical properties. For example, polypropylene is widely used as packaging film material. In the applications of the type, however, because of its relatively high melting point, polypropylene is generally copolymerized with ethylene or α-olefins of 4 to 20 carbon atoms in order to improve heat-sealing properties at low temperature, and is used in the form of propylene/α-olefin copolymer.

Packaging films formed from known propylene/α-olefin copolymers are still not sufficient in heat-sealing properties, though they are excellent in transparency and scratch resistance in comparison with those formed from low density polyethylene, and accordingly it is hoped that propylene/α-olefin copolymers excellent in heat-sealing properties even at lower temperatures will come to be obtained.

It is well known that the above-mentioned propylene/α-olefin random copolymers may be improved in heat-sealing properties by increasing the proportion of ethyene or α-olefin of 4 to 20 carbon atoms to propylene in the copolymer. However, if the proportion of ethylene or α-olefin of 4 to 20 carbon atoms is increased in the copolymerization, the resulting propylene/α-olefin copolymer increases in amount of the solvent-soluble component, whereby the resultant copolymers come to be poor in anti-blocking properties and also in stiffness.

Such propylene/α-olefin random copolymers excellent in heat-sealing properties, anti-block properties and stiffness as mentioned above are available only when they have a low melting point in spite of the fact that the proportion of α-olefin in the copolymer is small.

Incidentally, olefin polymerization catalysts composed generally of titanium compounds or vanadium compounds and organoaluminum compounds have heretofore been used for preparing ethylene copolymers. In recent years, however, catalysts composed of zirconium compounds and aluminoxane have been proposed of late as new Ziegler polymerization catalysts. Japanese Patent L-O-P Publn. No. 19309/1983 discloses a process for polymerizing ethylene and one or two or more $C_3$–$C_{12}$ α-olefins at a temperature of from −50° C. to 200° C. in the presence of a catalyst composed of a transition metal containing compound represented by the following formula

(Cyclopentadienyl)$_2$MeRHal wherein R is cyclopentadienyl, $C_1$–$C_6$ alkyl or halogen, Me is a transition metal, and Hal is halogen, and a linear aluminoxane represented by the following formula

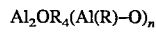

Al$_2$OR$_4$(Al(R)–O)$_n$ wherein R is methyl or ethyl, and n is a number of 4–20, or a cyclic aluminoxane represented by the following formula

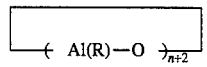

wherein R and n are as defined above. The publication cited above describes that ethylene should be polymerized in the presence of small amounts, up to 10% by weight, of somewhat long chain α-olefins or mixtures thereof in order to control a density of the resulting polyethlylene.

Japanese Patent L-O-P Publn. No. 95292/1984 discloses an invention relating to a process for preparing a linear aluminoxane represented by the following formula

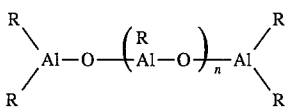

wherein n is 2–40, and R is $C_1$–$C_6$ alkyl, and cyclic aluminoxane represented by the following formula,

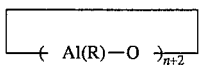

wherein n and R are as defined above. The publication cited above describes that olefins are polymerized in the presence of the aluminoxane prepared by the process of said publication, for example, methyl aluminoxane in admixture with a bis(cyclopentadienyl) compound of titanium or zirconium, whereupon at least twenty-five million g of polyethylene per 1 g of the transition metal per hour is obtained.

Japanese Patent L-O-P Publn. No. 35005/1985 discloses a process for preparing olefin polymerization catalysts, wherein an aluminoxane compound represented by the following formula

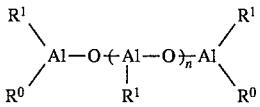

wherein $R^1$ is $C_1$–$C_{10}$ alkyl, and $R^0$ is $R^1$ or represents —O— by linkage therewith, is first allowed to react with a magnesium compound, the resulting reaction product is then chlorinated, followed by treating with a Ti, V, Zr or Cr compound. This publication cited above describes that the catalysts prepared by the process of said publication are particularly useful for the copolymerization of mixtures of ethylene and $C_3$–$C_{12}$ α-olefins.

Japanese Patent L-O-P Publn. No. 35006/1985 discloses a combination of (a) mono-, di- or tri-cyclopentadienyl of two or more different transition metals or derivatives thereof and (b) aluminoxane as a catalyst system for preparing reactor blend polymers. Example 1 of the above-cited publication discloses that polyethylene having a number average molecular weight of 15,300, a weight average molecular weight of 36,400 and containing 3.4% of the propylene component has been obtained by polymerization of ethylene with propylene in the presence of a combination of bis(pentamethylcyclopentadienyl)zirconium dimethyl and aluminoxane as the catalyst. Example 2 of the said publication discloses polymerization of ethylene with propylene in the presence of a combination of bis(pentamethylcyclopentadienyl)zirconium dichloride, bis(methylcyclopentadienyl)zirconium dichloride and aluminoxane as the catalyst, whereby a blend of polyethylene and ethylene/propylene copolymer is obtained, said polyethylene having a number average molecular weight of 2,000, a weight average molecular weight of 8,300 and the propylene content of 7.1 mol %, and comprising a toluene-soluble portion having a number average molecular weight of 2,200, a weight average molecular weight of 11,900 and the propylene content of 30 mol % and a toluene-insoluble portion having a number average molecular weight of 3,000, a weight average molecular weight of 7,400 and the propylene content of 4.8 mol %. Similarly, Example 3 of the said publication discloses a blend of LLDP and an ethylene/propylene copolymer, said LLDPE comprising a soluble portion having a molecular weight distribution ($\overline{M}w/\overline{M}n$) of 4.57 and the propylene content of 20.6% and an insoluble portion having the molecular weight distribution of 3.04 and the propylene content of 2.9 mol %.

Japanese Patent L-O-P Publn. No. 35007/1985 discloses a process for polymerizing ethylene alone or together with α-olefins of at least 3 carbon atoms in the presence of a catalyst system containing metallocene and a cyclic aluminoxane represented by the following formula

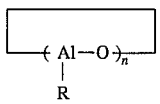

wherein R is alkyl of 1–5 carbon atoms, and n is an integer of 1 to about 20, or a linear aluminoxane represented by the following formula

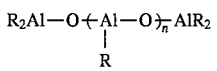

wherein R and n are as defined above. According to the said publication, the polymers obtained by the above-mentioned process are alleged to have a weight average molecular weight of from about 500 to about 1,400,000 and a molecular weight distribution of 1.5–4.0.

Japanese Patent L-O-P Publn. No. 35008/1985 discloses polyethylene or copolymers of ethylene and $C_3$–$C_{10}$ α-olefins, both having a broad molecular weight distribution, obtained by using a catalyst system containing at least two kinds of metallocenes and aluminoxane. The said copolymers disclosed in the above-mentioned publication are alleged to have a molecular weight distribution ($\overline{M}w/\overline{M}n$) of 2–50.

Japanese Patent L-O-P Publn. No. 130314/1986 discloses polypropylene high in isotacticity obtained by polymerization of propylene in the presence of a catalyst system comprising a sterically fixed zirconium-chelate compound and aluminoxane.

J. Am. Chem. Soc., 109, 6544 (1987) discloses formation of a high molecular weight isotactic polypropylene obtained by polymerization of propylene in the presence of a catalyst system comprising ethylenebis(indenyl)hafnium dichloride or its hydride and aluminoxane, said isotactic polypropylene having a narrow molecular weight distribution ($\overline{M}w/\overline{M}n$) of 2.1–2.4.

Japanese Patent L-O-P Publn. No. 142005/1987 discloses a stereoblock polypropylene having $\overline{M}w/\overline{M}n$ of 5.0–14.9 obtained by polymerization of propylene in the presence of a catalyst system comprising tetramethylethtlenebis(cyclopentadienyl) titanium chloride and aluminoxane. The polypropylene thus obtained is short in isotactic chain length and is a rubbery polymer.

The present inventors have come to accomplish the present invention on the basis of their finding that ethylene copolymers which are small in $\overline{M}w/\overline{M}n$ and narrow in molecular weight distribution and, moreover, large in $MFR_{10}/MFR_2$ and excellent in flowability are obtained by copolymerization of ethylene with α-olefins of 3–20 carbon atoms in the presence of olefin polymerization catalysts composed of specific hafnium compounds and organoaluminum oxy-compounds.

Furthermore, the present inventors have found that when propylene and α-olefins of 4–20 carbon atoms are copolymerized in the presence of olefin polymerization catalysts composed of specific hafnium compounds and aluminoxane, there are obtained propylene/α-olefin copolymers which are narrow in molecular weight distribution and small in amount of the α-olefin copolymerized therewith, but are low in melting point in comparison with conventionally known propylene/α-olefin copolymers, on which the present invention has been based.

Accordingly, the present invention is to solve such problems associated with the prior art as mentioned above, and an object of the invention is to provide ethylene copolymers which are small in $\overline{Mw}/\overline{Mn}$ and narrow in molecular weight distribution and, moreover, which are large in $MFR_{10}/MFR_2$ and excellent in flowability, and processes for preparing the same.

A further object of the invention is to provide propylene/α-olefin copolymers which are narrow in molecular weight distribution and small in amount of the α-olefin copolymerized therewith but have a low melting point and, moreover, which are excellent in heat-sealing properties and also excellent in anti-block properties and stiffness, and processes for preparing the same.

Another object of the invention is to provide olefin polymerization catalysts, which produce polymers which are narrow in molecular weight distribution in homopolymerization or narrow in molecular weight and composition distribution in copolymerization with high polymerization activities even by the use of small amounts of aluminoxane, furthermore, produce easily polymers which are high in molecular weight.

DISCLOSURE OF THE INVENTION

The ethylene copolymers of the present invention are those having (a) structural units derived from ethylene and (b) structural units derived from α-olefin of 3–20 carbon atoms, which are characterized in that they have (i) a density of 0.85–0.92 g/cm$^3$, (ii) an intrinsic viscosity [η] of 0.1–10 dl/g as measured in decalin decahydronaphthalene at 135° C., (iii) a ($\overline{Mw}/\overline{Mn}$) ratio of a weight average molecular weight ($\overline{Mw}$) to a number average molecular weight ($\overline{Mn}$) of 1.2–4 as measured by GPC, and (iv) a ($MFR_{10}/MFR_2$) ratio of $MFR_{10}$ under a load of 10 kg to $MFR_2$ under a load of 2.16 kg of 8–50 as measured at 190° C.

The processes for preparing ethylene copolymers of the present invention are characterized in that ethylene and α-olefins of 3–20 carbon atoms are copolymerized so that a density of the resulting copolymers becomes 0.85–0.92 g/cm$^3$, in the presence of catalysts formed from

[A] hafnium compounds having multidentate coordination compounds as ligands, in which at least two groups selected from among conjugated cycloalkadienyl groups or substituted groups thereof are linked together via lower alkylene groups, or hafnium compounds obtained by treating the above-mentioned hafnium compounds with alkylsilylated silica gel, and

[B] organoaluminum oxy-compounds.

The first propylene/α-olefin random copolymers of the present invention are those having (a) structural units derived from propylene and (b) structural units derived from α-olefins of 4–20 carbon atoms, which are characterized in that they have (i) 90–99 mol % of said structural units (a) and 1–10 mol % of said structural units (b), (ii) an intrinsic viscosity [η] of 0.5–6 dl/g as measured in decalin decahydronaphthalene at 135° C., (iii) a melting point [Tm], as measured by a differential scanning calorimeter, falling within the range of the formula 90<Tm<155−3.5 (100−P) wherein P is the propylene component (mol %) contained in the copolymer, (iv) a ($\overline{Mw}/\overline{Mn}$) ratio of less than 3.5 between a weight average molecular weight ($\overline{Mw}$) and a number average molecular weight ($\overline{Mn}$) as measured by GPC, and (v) a boiling trichloroethlylene-insoluble matter in an amount of less than 5% by weight.

The processes for preparing the first propylene/α-olefin copolymers of the present invention are characterized in that propylene and α-olefins of 4–20 carbon atoms are copolymerized at a temperature of 40°–100° C. so that the resulting copolymers have 90–99 mol % of structural units (a) derived from propylene and 1–10 mol % of structural units (b) derived from the α-olefin, in the presence of catalysts formed from

[A] hafnium compounds having multidentate coordination compounds as ligands, in which at least two groups selected from among conjugated cycloalkadienyl groups or substituted groups thereof are linked together via lower alkylene groups, and

[B] organoaluminum oxy-compounds.

The second propylene/α-olefin random copolymers of the present invention are those having (a) structural units derived from propylene, (b) structural units derived from ethylene and (c) structural units derived from α-olefins of 4–20 carbon atoms, which are characterized in that they have (i) 90–99 mol % of said structural units (a), 0.5–9.5 mol % of said structural units (b) and 0.5–9.5 mol % of said structural units (c), (ii) an intrinsic viscosity [η] of 0.5–6 dl/g as measured in decalin at 135° C., (iii) a melting point [Tm], as measured by a differential scanning calorimeter, falling within the range of the formula 70<Tm<155−5.5 (100−P) wherein P is the propylene component (mol %) contained in the copolymer, and (iv) a boiling trichloroethylene-insoluble matter in an amount of less than 5% by weight.

The processes for preparing the second propyleneα-olefin copolymers of the present invention are characterized in that propylene, ethylene and α-olefins of 4–20 carbon atoms are copolymerized so that the resulting copolymers have 90–99 mol % of structural units (a) derived from propylene, 0.5–9.5 mol % of structural units (b) and 0.5–9.5 mol % of structural units (c), in the presence of catalysts formed from

[A] hafnium compounds having multiclentate coordination compounds as ligands in which at least two groups selected from among conjugated cycloalkadienyl groups or substituted groups thereof are linked together via lower alkylene groups, and

[B] organoaluminum oxy-compounds.

In accordance with the present invention, there are provided olefin polymerization catalysts formed from

[A] hafnium compounds having multidentate coordination compounds as ligands in which at least two groups selected from conjugated cycloalkadienyl groups or substituted groups thereof are linked together via lower alkylene groups,

[B] organoaluminum oxy-compounds, and

[C] organoaluminum compounds.

In accordance with the present invention, furthermore, there are provided olefin polymerization catalysts formed from

[A] hafnium compounds having multidentate coordination compounds as ligands in which at least two groups selected from among conjugated cycloalkadienyl groups or substituted groups thereof are linked together via lower alkylene groups,

[B-1] organoaluminum oxy-compounds formed from tri-n-alkyl aluminum, and

[B-2] organoaluminum oxy-compounds in which at least one hydrocarbon group other than n-alkyl group is bonded to Al atom.

BRIEF DESCRIPTION OF THE DRAWINGS

FIG. 1 is an illustration of the process for the preparation of the olefin copolymers of the present invention.

BEST MODE OF PRACTICING THE INVENTION

Figure 2:
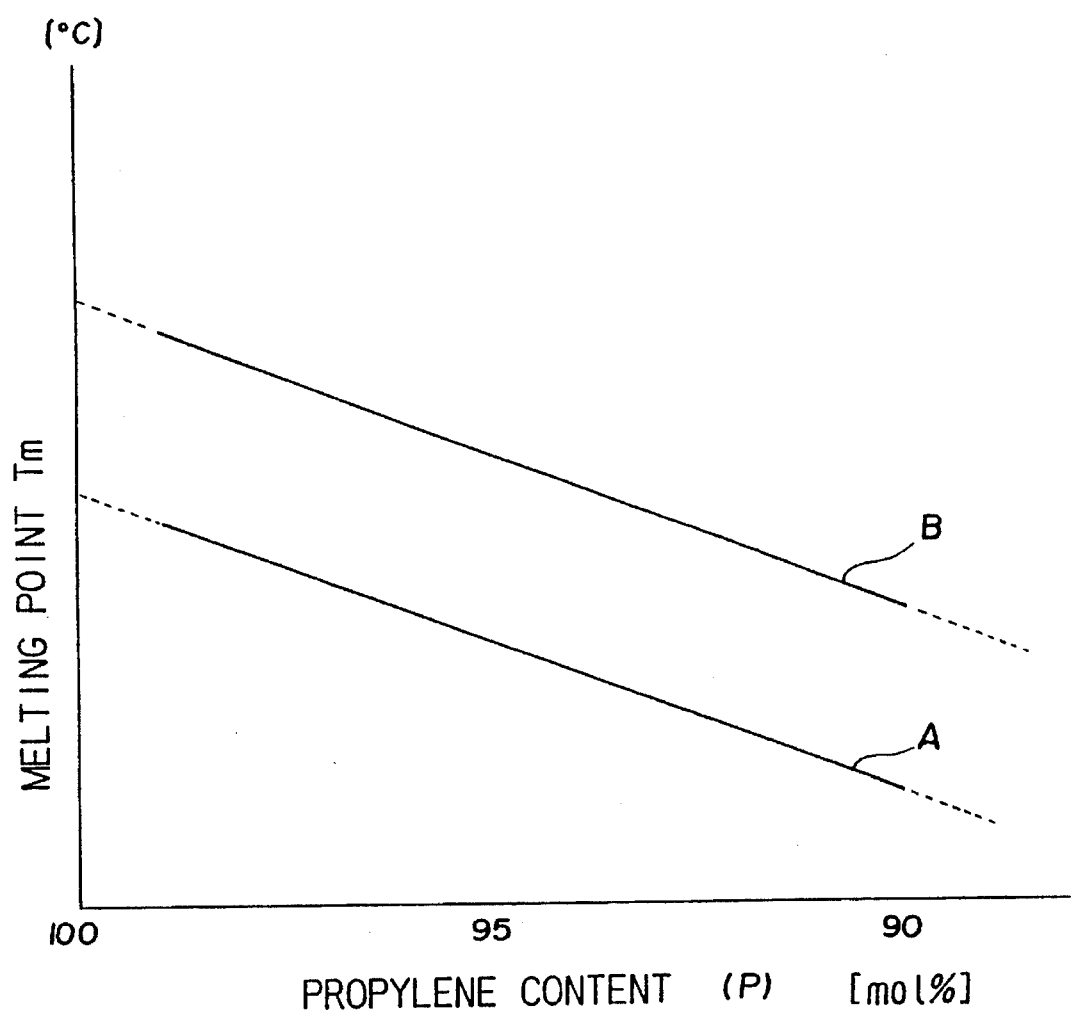
FIG. 2 is a graph showing the relationship between the propylene content and melting point of the propylene random copolymer of the present invention.

The ethylene copolymers of the present invention and processes for preparing the same are illustrated below in detail.

The process for the preparation of the ethylene copolymers of the present invention is illustratively shown in FIG. 1.

The ethylene copolymers of the invention are random copolymers of ethylene and α-olefins of 3–20 carbon atoms. The ethylene copolymers have a density of 0.85–0.92 g/cm$^3$, preferably 0.85–0.91 g/cm$^3$ and especially 0.85–0.90 g/cm$^3$.

In this connection, the density of these ethylene copolymers was measured by gradient tube density determination using the strand of ethylene copolymer used at the time of determining MFR$_2$ under a load of 2.16 kg at 190° C.

In these ethylene copolymers, are present desirably structural units (a) derived from ethylene in an amount of 60–96 mol %, preferably 65–95 mol % and especially 70–94 mol %, and structural units (b) derived from α-olefin of 3–20 carbon atoms in an amount of 4–40 mol %, preferably 5–35 mol % and especially 6–30 mol %.

The composition of the copolymer is determined by measuring a spectrum of $^{13}$C-NMR of a specimen obtained by dissolving about 200 mg of the copolymer in 1 ml of hexachlorobutadiene in a test tube of 10 mmφ under the conditions of a measurement temperature of 120° C., measurement frequency of 25.05 MHz, spectrum width of 1500 Hz, pulse repetition time of 4.2 sec. and pulse width of 6 sec.

Alpha olefin of 3–20 carbon atoms used in the present invention include propylene, 1-butene, 1-pentene, 1-hexene, 4-methyl-1-pentene, 1-octene, 1-decene, 1-dodecene, 1-tetradecene, 1-hexadecene, 1-octadecene, 1-eicosene, etc.

The ethylene copolymers of the present invention desirably have an intrinsic viscosity [η] of 0.1–10 dl/g, preferably 0.5–6 dl/g as measured in decalin at 135° C.

The molecular weight distribution ($\overline{M}w/\overline{M}n$) as obtained by gel permeation chromatography (GPC) of the ethylene copolymers of the invention is 1.2–4, preferably 1.4–3.5 and especially 1.5–3.0. As is evidenced by the foregoing, the ethylene copolymers of the invention are narrow in molecular weight distribution and excellent in anti-block properties.

In this connection, a value of ($\overline{M}w/\overline{M}n$) obtained in the invention was determined by the following procedure in accordance with Takeuchi, "Gel Permeation Chromatography," Maruzen, Tokyo.

(1) Using a standard polystyrene having the known molecular weight (a monodispersed polystyrene produced and sold by Toyo Soda K. K.), molecular weight M and GPC (Gel Permeation Chromatography) count of the sample are measured to prepare a correlation diagram calibration curve of the molecular weight M and EV (Elution Volume). The concentration of the sample used is maintained at 0.02% by weight.

(2) GPC chromatograph of the sample is taken by GPC measurement, and a number average molecular weight $\overline{M}n$ and a weight average molecular weight $\overline{M}w$, in terms of polystyrene, are calculated from the calibration curve mentioned in the above procedure (1) to obtain a value of $\overline{M}w/\overline{M}n$. In that case, the conditions under which the sample is prepared, and the conditions under which GPC measurement is conducted are as follows:

[Preparation of sample]

(a) The sample is put in an Erlenmeyer flask together with o-dichlorobenzene so that the same amounts to 0.1% by weight.

(b) The Erlenmeyer flask is heated at 140° C. and stirred for about 30 minutes to dissolve the sample in o-dichlorobenzene.

(c) The solution is subjected to GPC.

[GPC measurement conditions]

The measurement was conducted under the following conditions.

| | |
|---|---|
| (a) Apparatus | 150C-ALC/GPC manufactured by Waters Co. |
| (b) Column | GMH Type manufactured by Toyo Soda K.K. |
| (c) Amount of sample | 400 μl |
| (d) Temperature | 140° C. |
| (e) Flow rate | 1 ml/min |

In the ethylene copolymers of the invention, a (MFR$_{10}$/MFR$_2$) ratio of MFR$_{10}$ at 190° C. under a load of 10 kg to MFR$_2$ at 190° C. under a load of 2.16 kg is 8–50, preferably 8.5–45 and especially 9–40.

Such ethylene copolymers having the MFR$_{10}$/MFR$_2$ ratio falling within the range of 8–50 as mentioned above are quite favorable in flowability at the time when they are melted.

In contrast thereto, the aforementioned known ethylene copolymers having the $\overline{M}w/\overline{M}n$ ratio of 1.2–4 will come to have the MFR$_{10}$/MFR$_2$ ratio in the range of 4–7, and hence they are poor in flowability at the time when they are melted.

As mentioned above, the ethylene copolymers of the present invention have such excellent characteristics that they have a small molecular weight distribution ($\overline{M}w/\overline{M}n$), and molded articles resulting therefrom are less sticky and, at the same time, they are large in MFR$_{10}$/MFR$_2$ and excellent in flowability at the time when they are melted.

The ethylene copolymers of the invention as illustrated above may be prepared by copolymerization of ethylene with α-olefins of 3–20 carbon atoms so that the resulting copolymers have a density of 0.85–0.92 g/cm$^3$ in the presence of catalysts formed from

[A] hafnium compounds having multidentate coordination compounds as ligands in which at least two groups selected from among conjugated cycloalkadienyl groups or substituted groups thereof are linked together via lower alkylene, or hafnium catalyst components obtained by treating the above-mentioned hafnium compounds with alkylsilylated silica gel, and

[B] organoaluminum oxy-compounds.

The catalyst components [A] used in the invention are hafnium compounds having multidentate coordination compounds as ligands in which at least two groups selected from among conjugated cycloalkadienyl groups or substituted groups thereof, e.g. indenyl group, substituted indenyl group and partially hydrated compounds thereof, are linked together via lower alkylene groups, e.g., having from 1 to 4 carbon atoms, or compounds obtained by treating the above-mentioned hafnium compounds with alkylsilylated silica gel.

The above-mentioned hafnium compounds include, for example, the following compounds.

Ethylenebis(indenyl)dimethyl hafnium,
Ethylenebis(indenyl)diethyl hafnium,
Ethylenebis(indenyl)diphenyl hafnium,
Ethylenebis(indenyl)methyl hafnium monochloride,
Ethylenebis(indenyl)ethyl hafnium monochloride,
Ethylenebis(indenyl)methyl hafnium monobromide,
Ethylenebis(indenyl)hafnium dichloride,
Ethylenebis(indenyl)hafnium dibromide,
Ethylenebis(4,5,6,7-tetrahydro-1-indenyl)dimethyl hafnium,
Ethylenebis(4,5,6,7-tetrahydro-1-indenyl)methyl hafnium monochloride,
Ethylenebis(4,5,6,7-tetrahydro-1-indenyl)hafnium dichloride,
Ethylenebis(4,5,6,7-tetrahydro-1-indenyl)hafnium dibromide,
Ethylenebis(4-methyl-1-indenyl)hafnium dichloride,
Ethylenebis(5-methyl-1-indenyl)hafnium dichloride,
Ethylenebis(6-methyl-1-indenyl)hafnium dichloride,
Ethylenebis(7-methyl-1-indenyl)hafnium dichloride,
Ethylenebis(5-methoxy-1-indenyl)hafnium dichloride,
Ethylenebis(2,3-dimethyl-1-indenyl)hafnium dichloride,
Ethylenebis(4,7-dimethyl-1-indenyl)hafnium dichloride,
Ethylenebis(4,7-dimethoxy-1-indenyl)hafnium dichloride.

The above-mentioned hafnium compounds may contain small amounts of zirconium or titanium. In such a case, the content of zirconium or titanium is less than 1% by weight, preferably less than 0.7% by weight and especially less than 0.5% by weight.

The hafnium catalyst components used in the present invention may include compounds obtained by treating the above-mentioned hafnium compounds with alkylsilylated silica gel. More particularly, the said hafnium catalyst components may be hafnium compound solutions which are obtained, for example, by passing a solution of the above-mentioned hafnium compound in an organic solvent such as toluene through a column packed with alkylsilylated silica gel, wherein said hafnium compound is brought into contact with the alkylsilylated silica gel.

The organic solvents used in that case are preferably aromatic hydrocarbons such as toluene, benzene and xylene. The alkylsilylated silica gel used may include those obtained by treating silica gel with dimethyl dichlorosilane, ethylmethyl dichlorosilane, trimethyl chlorosilane, trimethyl bromosilane, divinyl dichlorosilane, diethyl dichlorosilane or methylpropyl dichlorosilane. The hafnium concentration in the hafnium compound solution is usually from $1 \times 10^{-5}$ to $5 \times 10^{-3}$ mol/l, and the amount of the alkylsilylated silica gel used is usually 20–500 g per 1 mmol of the hafnium compound. A temperature at which the hafnium compound solution is brought into contact with the alkylsilylated silica gel is usually 0°–50° C.

When the hafnium catalyst components obtained by treating the above-mentioned hafnium compounds with the alkylsilylated silica gel are used as the catalyst components [A], ethylene copolymers excellent in transparency are obtained.

The catalyst components [B] used in the process of the present invention are organoaluminum oxy-compounds. The organoaluminum oxy-compounds used as the catalyst components may be shown as benzene-soluble aluminoxanes represented by the following general formulas (1) and (II).

   (I)

   (II)

wherein R may be the same or different and is a hydrocarbon group such as methyl, ethyl, propyl or butyl, preferably methyl or ethyl and especially methyl, and m is an integer of at least 2, preferably at least 5. The above-mentioned aluminoxanes may be prepared, for example, by the procedures as exemplified below.

(1) A procedure which comprises reacting a suspension in a hydrocarbon medium of a compound containing water of absorption or a salt containing water of crystallization, for example, magnesium chloride hydrate, copper sulfate hydrate, alumiumsulfate hydrate, nickel sulfate hydrate or cerous chloride hydrate, with trialkylaluminum.

(b 2) A procedure which comprises reacting trialkylaluminum directly with water, water vapor or ice in a medium such as benzene, toluene, ethyl ether and tetrahydrofuran.

The aluminoxanes as illustrated above may contain small amounts of organometallic components.

Further, the organoaluminum oxy-compounds used in the present invention may be those which are insoluble in benzene. The benzene-insoluble organoaluminum oxy-compounds are illustrated hereinafter.

The benzene-insoluble organoaluminum oxy-compounds used in the invention may be prepared by (i) reaction of organoaluminum compounds with water or (ii) reaction of solutions of aluminoxane, for example, hydrocarbon solutions thereof, with water or active hydrogen-containing compounds.

The benzene-insoluble organoaluminum oxy-compounds are considered to have alkyloxyaluminum units represented by the formula

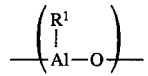

wherein $R^1$ is hydrocarbon of 1~12 carbon atoms and Al component soluble in benzene at 60° C. is in an amount, in terms of Al atom, of less than 10%, preferably less than 5% and especially less than 2%, thus they are insoluble or sparingly soluble in benzene.

Solubility in benzene of the organoaluminum oxy-compounds of the present invention is determined by suspending the organoaluminum oxy-compound equivalent to Al of 100 mg atom in 100 ml of benzene, stirring the suspension at 60° C. for 6 hours, filtering the thus treated suspension at a temperature elevated to 60° C. using G-5 glass filter equipped with a jacket, washing 4 times the solids portion separated on the filter with 50 ml of benzene kept at 60° C. and then measuring the amount of Al atoms (X mmol) present in the total filtrate.

In the alkyloxyaluminum units mentioned above, $R^1$ is methyl, ethyl, n-propyl, isopropyl, n-butyl, isobutyl, pentyl, hexyl, octyl, decyl, cyclohexyl, cyclooctyl, etc. Among these, preferred are methyl and ethyl, particularly methyl.

In addition to the alkyloxyaluminum units of the formula

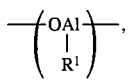

the benzene-insoluble organoaluminum oxy-compounds of the invention may contain oxyaluminum units represented by the formula

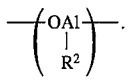

In the above-mentioned formulas, $R^1$ is as defined previously, $R^2$ is hydrocarbon of 1~12 carbon atoms, alkoxyl of 1~12 carbon atoms aryloxy of 6~20 carbon atoms, hydroxyl, halogen or hydrogen, and $R^1$ and $R^2$ represent the groups different from each other. In that case, the benzene-insoluble organoaluminum oxy-compounds are preferably those containing the alkyloxyaluminum units

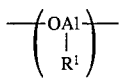

in the proportion of at least 30 mol %, preferably at least 50 mol % and especially at least 70 mol %.

The organoaluminum compounds (i) used for preparing such benzene-insoluble organoaluminum oxy-compounds as mentioned above are those represented by the formula $R^1{}_n AlX_{3-n}$ wherein $R^1$ is hydrocarbon of 1~12 carbon atoms, X is halogen, alkoxyl of 1~12 carbon atoms, aryloxy of 6~20 carbon atoms or hydrogen, and n is 2~3.

Such organoaluminum compounds (i) as mentioned above include trialkylaluminum such as trimethylaluminum, triethylaluminum, tripropylaluminum, triisopropylaluminum, tri-n-butylaluminum, tri-sec-butylaluminum, tri-tert-butylaluminum, tripentylaluminum, trihexylaluminum, trioctylaluminum, tridecylaluminum, tricyclohexylaluminum and tricyclooctylaluminum; dialkylaluminum halides such as dimethylaluminum chloride, dimethylaluminum bromide, diethylaluminum chloride, diethylaluminum bromide, and diisobutylaluminum chloride; dialkylaluminum hydrides such as diethylaluminum hydride and diisobutylaluminum hydride; dialkylaluminum alkoxides such as dimethylaluminum methoxide and diethylaluminum ethoxide; and dialkylaluminum aryloxides such as diethylaluminum phenoxide. Of these organoaluminum compounds, preferred are those of the above-mentioned general formula in which $R^1$ is alkyl and X is chlorine, and particularly preferred is trialkylaluminum.

In this connection, isoprenylaluminum of the general formula $(i-C_4H_9)_x Al_y (C_5H_{10})_z$ wherein x, y and z are each positive integer, and $z \geq 2x$ may also used as the organoaluminum compound (i).

The organoaluminum compounds (i) as illustrated above may be used either singly or in combination.

The active hydrogen-containing compounds (ii) used in preparing the benzene-insoluble organoaluminum oxy-compounds of the present invention include alcohols such as methyl alcohol and ethyl alcohol, and diols such as ethylene glycol and hydroquinone.

When water is used in preparing the benzene-insoluble organoaluminum oxy-compounds of the present invention, the water may be used after dissolving or suspending in hydrocarbon solvents such as benzene, toluene and hexane, ether solvents such as tetrahydrofuran, and amine solvents such as triethylamine, or may be used in the form of water vapor or ice. As the water, moreover, there may also be used water of crystallization of salt such as magnesium chloride, magnesium sulfate, aluminum sulfate, copper sulfate, nickel sulfate, iron sulfate and cerous chloride, or water of adsorption adsorbed to inorganic compounds such as silica, alumina and aluminum hydroxide or polymers.

As mentioned above, the benzene-insoluble organoaluminum oxy-compounds of the present invention may be prepared by reaction of the organoaluminum compound (i) with water, or by reaction of a solution of aluminoxane, for example, a hydrocarbon solution thereof, with water or the active hydrogen containing compound. In preparing the benzene-insoluble organoaluminum oxy-compound from the organoaluminum compound and water, the organoaluminum compound is brought into contact with water in a solvent, for example, a hydrocarbon solvent, and in that case, the water is added to the reaction system so that the organoaluminum atoms dissolved in the reaction system become less than 20% based on the total organoaluminum atom. In obtaining the benzene-insoluble organoaluminum oxy-compounds according to the procedure as mentioned above, it is desirable that the water is brought into contact with the organoaluminum compound in the proportion of 1~5 moles, preferably 1.5~3 moles of the water to 1 mole of the organoaluminum compound.

The above-mentioned reaction for forming the benzene-insoluble organoaluminum oxy-compounds is carried out in solvents, for example, hydrocarbon solvents. The solvents used include aromatic hydrocarbons such as benzene, toluene, xylene, cumene and cymene, aliphatic hydrocarbons such as butane, isobutane, pentane, hexane, octane, decane, dodecane, hexadecane and octadecane, alicyclic hydrocarbons such as cyclopentane, cyclooctane, cyclodecane and cyclododecane, such hydrocarbon solvents, for example, petroleum fractions, as gasoline, kerosine and gas oil, halides of the above-mentioned aromatic hydrocarbons, aliphatic hydrocarbons and alicyclic hydrocarbons, especially chlorides and bromides thereof, and ethers such as ethyl ether and tetrahydrofuran. Among these hydrocarbon media as exemplified above, particularly preferred are aromatic hydrocarbons.

A concentration in terms of Al atom of the organoaluminum compound in the reaction system is desirably $1 \times 10^{-3}$ to 5 gram atom/l preferably $1 \times 10^{-2}$ to 3 gram atom/l, and a concentration in the reaction system of water such as water of crystallization is usually $1 \times 10^{-3}$ to 20 mol/l, preferably $1 \times 10^{-2}$ to 10 mol/l. In that case, it is desirable that the organoaluminum atoms dissolved in the reaction system are less than 20%, preferably less than 10% and especially in the range of from 0 to 5% based on the total organoaluminum atom.

Contact of the organoaluminum compound with water may be carried out, for example, by the following procedures.

(1) A procedure wherein a hydrocarbon solution of organoaluminum is brought into contact with a hydrocarbon solvent containing water.

(2) A procedure wherein water vapor is blown into a hydrocarbon solution of organoaluminum, thereby bringing the organoaluminum into contact with the water vapor.

(3) A procedure wherein a hydrocarbon solution of organoaluminum is mixed with a hydrocarbon suspension of a compound containing water of adsorption or a compound containing water of crystallization, thereby bringing the organoaluminum into contact with the water of adsorption or water of crystallization.

(4) A procedure wherein a hydrocarbon solution of organoaluminum is brought into contact with ice.

The above-mentioned reaction of the organoaluminum with water is carried out usually at a temperature of from −100° to 150° C., preferably −50° to 100° C. and especially −30° to 80° C. The reaction time, though it may largely vary depending upon the reaction temperature, is usually from 1 to 200 hours, preferably 2 to 100 hours.

In preparing the benzene-insoluble organoaluminum oxy-compounds from a solution of aluminoxane and water or a active hydrogen-containing compound, the aluminoxane present in the solution of aluminoxane is brought into contact with water or the active hydrogen-containing compound.

The solution of aluminoxane is a solution of aluminoxane in such a solvent as used in forming the above-mentioned benzene-insoluble organoaluminum oxy-compounds, preferably aromatic hydrocarbons such as benzene and toluene, and this solution may contain other components so long as they do not affect adversely the reaction between the aluminoxane and water or the active hydrogen-containing compound.

The amount of water or the active hydrogen-containing compound used in the above-mentioned reaction is 0.1 to 5 moles, preferably 0.2 to 3 moles based on 1 gram atom of aluminum present in the solution of aluminoxane. A concentration in the reaction system of aluminoxane in terms of aluminum atom is usually $1 \times 10^{-3}$ to 5 gram atom/l, preferably $1 \times 10^{-2}$ to 3 gram atom/l, and a concentration in the reaction system of water is usually $2 \times 10^{-4}$ to 5 mole/l, preferably $2 \times 10^{-3}$ to 3 mole/l.

Taking, as an example, the reaction of the solution of aluminoxane with water, said solution of aluminoxane is brought into contact with water or the active hydrogen-containing compound, for example, by the following methods.

(1) A method which comprises bringing the solution of aluminoxane into contact with a hydrocarbon solvent containing water.

(2) A method which comprises blowing water vapor into the solution of aluminoxane, thereby bringing the aluminoxane present in the solution of aluminoxane into contact with the water vapor.

(3) A method which comprises mixing the solution of aluminoxane with a hydrocarbon solution of a compound containing water of adsorption or a compound containing water of crystallization, thereby bringing the aluminoxane present in the solution of aluminoxane into contact with the water of adsorption or water of crystallization.

(4) A method which comprises bringing the solution of aluminoxane into contact directly with water or ice.

The above-mentioned procedures may also be applied to the case wherein the active hydrogen-containing compound (ii) is used instead of water.

The reaction of the solution of aluminoxane with water or the active hydrogen-containing compound as illustrated above may be carried out usually at a temperature of from −50° to 150° C., preferably 0° to 120° C. and especially 20°–100° C. The reaction temperature, through it may largely vary depending upon the reaction temperature, is usually 0.5–300 hours, preferably about 1–150 hours.

In preparing the ethylene copolymers by using the olefin polymerization catalysts as mentioned above, a concentration in the polymerization system of the hafnium compound in terms of hafnium atom is usually $10^{-8}$ to $10^{-2}$ gram atom/l, preferably $10^{-7}$ to $10^{-3}$ gram atom/l.

The above-mentioned organoaluminum oxy-compounds are desirably used in an amount in terms of aluminum atom present in the reaction system of $10^{-4}$ to $10^{-1}$ gram atom/l, preferably $5 \times 10^{-4}$ to $5 \times 10^{-2}$ gram atom/l.

The polymerization temperature employed is from −50° to 150° C., preferably from 0° to 120° C.

The olefin polymerization mentioned above is carried out usually in vapor phase or liquid phase. In the liquid phase polymerization, the solvent used may be inert hydrocarbon, or the olefin itself may also be used as the solvent.

The hydrocarbon used in that case includes aliphatic hydrocarbons such as butane, isobutane, pentane, hexane, heptane, octane, decane, dodecane, hexadecane and octadecane, alicyclic hydrocarbons such as cyclopentane, methylcyclopentane, cyclohexane and cyclooctane, aromatic hydrocarbons such as benzene, toluene and xylene, and petroleum fractions such as gasoline, kerosine and gas oil.

The polymerization pressure employed is usually from ordinary pressure to 100 kg/cm$^2$, preferably from ordinary pressure to 50 kg/cm$^2$, and the polymerization may be carried out batchwise, semi-continuously or continuously. A molecular weight of the resulting polymer may be modified by the addition of hydrogen and/or by regulation of the polymerization temperature employed.

Hereinafter, the first propylene/α-olefin random copolymers and process for preparing the same of the present invention are illustrated in detail.

The propylene/α-olefin random copolymers of the present invention are random copolymers of propylene and α-olefins of 4–20 carbon atoms. The propylene/α-olefin random copolymers of the invention desirably contain structural units (a) derived from propylene in an amount of 90 □99 mol %, preferably 92–98 mol %, and structural units (b) derived from α-olefin in an amount of 1–10 mol %, preferably 2–8 mol %. When the structural units (a) derived from propylene contained in the propylene/α-olefin random copolymer are less than 90 mol %, said copolymer tends to become poor in anti-blocking properties and stiffness and, on the other hand, when said units (a) are in excess of 99 mol %, said copolymer tends to increase in melting point and become poor in heat-sealing properties.

α-olefins of 4–20 carbon atoms used herein include 1-butene, 1-pentene, 1-hexene, 4-methyl-1-pentene, 3-methyl-1-pentene, 1-octene, 1-decene, 1-dodecene, 1-tetradecene, 1-hexadecene, 1-octadecene and 1-eicosene. Among these, particularly preferred is 1-butene.

The propylene/olefin random copolymers of the present invention desirably have an intrinsic viscosity [η] of 0.5–6 dl/g, preferably 1–5 dl/g as measured in decalin at 135° C. If this intrinsic viscosity is less than 0.5 dl/g, the copolymers tend to become poor in anti-blocking properties and toughness and, on the other hand if said intrinsic viscosity exceeds 6 dl/g, the copolymers tend to become port in moldability.

Further, the propylene/α-olefin random copolymers of the invention have a melting point [Tm] as measured by a differential scanning calorimeter falling within the range of 90<Tm<155–3.5 (100–P), preferably 100<Tm<150–3.5 (100–P)

wherein P is the content (mol %) of propylene in the copolymer.

In FIG. 2, there is shown as a straight line A the schematic relationship between the melting point Tm of the above-mentioned propylene/α-olefin random copolymer and the propylene content (mol %) present in said copolymer. In this FIG. 2, there is also shown as a straight line B the relationship between the melting point Tm of the known propylene/α-olefin random copolymer and the propylene content (mol %) present in said copolymer.

As is clear from FIG. 2, the melting point of the first propylene/α-olefin random copolymers of the present invention is lower by 10°–20° C. than that of the known propylene/α-olefin random copolymers when the amount of α-olefin copolymerized of the former is the same as that of the latter. Accordingly, films obtained from the first propylene/α-olefin random copolymers of the invention are excellent particularly in heat-sealing properties at low temperatures, and the films exhibit excellent heat-sealing properties even when they have small amounts of the copolymerized α-olefin, and hence they are excellent in anti-blocking properties and have excellent stiffness.

In the present invention, the propylene/α-olefin random copolymer was allowed to stand in a differential scanning calorimeter (DSC) at 200° C. for 5 minutes, cooled up to 20° C. at a rate of 10° C./min, and allowed to stand at 20° C. for 5 minutes, and then the temperature was elevated from 20° C. to 200° C. at a rate of 10° C./min to obtain a temperature (Tm) at a maximum endothermic peak which was then taken as a melting point of said propylene/α-olefin random copolymer.

The molecular weight distribution ($\overline{Mw}/\overline{Mn}$) of the first propylene/α-olefin random copolymers of the invention as obtained by gel permeation chromatography (GPC) is less than 3.5, preferably less than 3.0 and especially less than 2.5. As stated above, the first propylene/α-olefin random copolymers of the invention are narrow in molecular weight distribution and, from this point, they have excellent anti-blocking properties.

The determination of melting point was conducted by using about 2.5 mg of the specimen and DSC of Perkin Elmer-7 Model at heat-up rate of 10° C./min.

The first propylene/α-olefin random copolymers of the invention are desirably to have a soluble portion in boiling n-pentane in an amount of less than 3% by weight, preferably less than 2% by weight and especially less than 1% by weight.

Further, the first propylene/α-olefin random copolymers of the invention are desirably to have an insoluble portion in boiling trichloroethylene in an amount of less than 5% by weight, preferably less than 3% by weight and especially less than 1% by weight.

The amounts of the insoluble portion in boiling trichloroethylene and the soluble portion in boiling n-pentane were determined by such a manner that about 3 g of the finely pulverized specimen was extracted for 5 hours with 180 ml of each of the solvents in a cylindrical filter paper by using a Soxhlet's extractor, and the extraction residue was dried with a vacuum dryer until it reached a constant weight to obtain the weight thereof, whereby a difference in weight between the dried residue and the original specimen is calculated.

The first propylene/α-olefin random copolymers of the present invention as illustrated above may be prepared by copolymerizing propylene and α-olefin of 4~20 carbon atoms at a temperature of 40°~100° C. so that the structural units (a) derived from propylene are present in an amount of 90~99 mol % and the structural units (b) derived from α-olefin are present in an amount of 1~10 mol %, in the presence of catalysts formed from

[A] hafnium compounds having as ligands multidentate compounds in which at least two groups selected from among conjugated cycloalkadienyl groups or substituted groups thereof are linked together via lower alkylene groups, and

[B] organoaluminum oxy-compounds.

In that case, the copolymerization may be carried out by employing the same conditions as used in the preparation of the aforementioned ethylene copolymers.

The first propylene/α-olefin random copolymers of the present invention are excellent particularly in heat-sealing properties at low temperatures and hence are used as heat-sealing agents.

Hereinafter, the second propylene random copolymers and process for preparing the same of the present invention are illustrated in detail.

The second propylene random copolymers of the invention are random copolymers of propylene, ethylene and α-olefin of 4~20 carbon atoms. In the propylene random copolymers, the structural units (a) derived from propylene are present in an amount of 90~99 mol %, preferably 92~98 mol %, the structural units (b) derived from ethylene in an amount of 0.5~9.5 mol %, preferably 1~9 mol %, and the structural units (c) derived from α-olefin in an amount of 0.5~9.5 mol %, preferably 1~9 mol %. If the structural units (a) derived from propylene present in the said copolymers are less than 90 mol %, the copolymers tend to become poor in anti-blocking properties and stiffness. On the other hand, if the structural units (a) exceed 99 mol %, the copolymers tend to increase in melting point and become poor in heat-sealing properties.

α-olefins of 4~20 carbon atoms used herein include 1-butene, 1-pentene, 1-hexene, 4-methyl-1-pentene, 3-methyl-1-pentene, 1-octane, 1-decene, 1-dodecene, 1-tetradecene, 1-hexadecene, 1-octadecene and 1-eicosene. Among these, particularly preferred is 1-butene.

The second propylene random copolymers of the invention desirably have an intrinsic viscosity [η] as measured in decalin at 135° C. of 0.5~6 dl/g, preferably 1~5 dl/g. If this intrinsic viscosity is less than 0.5 dl/g, the copolymers tend to become poor in anti-blocking properties and toughness and, on the other hand, if said intrinsic viscosity exceeds 6 dl/g, the copolymers tend to become poor in moldability.

Further, the second propylene/α-olefin random copolymers of the invention have a melting point [Tm] as measured by a differential scanning calorimeter falling within the range of 70<Tm<155–5.5 (100–P), preferably
90<Tm<150–5.5 (100–P)

wherein P is the content (mol %) of propylene in the copolymer.

The schematic relationship between the melting point Tm of the above-mentioned propylene random copolymer and the propylene content (mol %) in said copolymer is the same as shown in FIG. 2.

In this manner, the melting point of the second propylene random copolymers is lower by 10°~20° C. than that of the known propylene/α-olefin random copolymers when the amounts of ethylene and α-olefin copolymerized of the former are the same as those of the latter. Accordingly, films obtained from the second propylene random copolymers of the invention are excellent particularly in heat-sealing properties at low temperatures, and the films exhibit excellent heat-sealing properties even when they have small amounts of ethylene and α-olefin copolymerized, and hence they are excellent in anti-blocking properties and have excellent stiffness.

Further, the molecular weight distribution ($\overline{Mw}/\overline{Mn}$) of the second propylene random copolymers of the invention as obtained by gel permeation chromatography (GPC) is less than 3.5, preferably less than 3.0 and especially less than 2.5. As stated above, the second propylene random copolymers of the invention are narrow in molecular weight distribution and, from this point, they have excellent anti-blocking properties.

The second propylene random copolymers of the invention are desirably to have a soluble portion in boiling n-pentane in an amount of less than 5% by weight, preferably less than 3% by weight and especially less than 2% by weight.

Furthermore, the second propylene random copolymers of the invention are desirably to have an insoluble portion in boiling trichloroethylene in an amount of less than 5% by weight, preferably less than 3% by weight and especially less than 1% by weight.

The second propylene random copolymers of the present invention as illustrated above may be prepared by copolymerizing propylene, ethylene and α-olefin of 4~20 carbon atoms at a temperature of 40°~100° C. so that the structural units (a) derived from propylene are present in an amount of 90~99 mol % in time resulting copolymers, the structural units (b) derived from ethylene in an amount of 0.5~9.5 mol %, and the structural units (c) derived from α-olefin in an amount of 0.5~9.5 mol %, in the presence of catalysts formed from

[A] hafnium compounds having as ligands multidentate compounds in which at least two groups selected from among conjugated cycloalkadienyl groups or substituted groups thereof are linked together via lower alkylene groups, and

[B] organoaluminum oxy-compounds.

In that case, the copolymerization may be carried out by employing the same conditions as used in the preparation of the aforementioned ethylene copolymers.

The second propylene random copolymers of the invention as illustrated above are excellent particularly in heat-sealing properties at low temperatures, and hence are used as heat-sealing agents.

Hereinafter, the first olefin polymerization catalysts of the present invention are illustrated in detail.

The first olefin polymerization catalysts of the invention are formed from

[A] hafnium compounds having as ligands multidentate compounds in which at least two groups selected from among conjugated cycloalkadienyl groups or substituted groups thereof are linked together via lower alkylene groups,

[B] organoaluminum oxy-compounds, and

[C] organoaluminum compounds.

In the olefin polymerization catalyst mentioned above, the hafnium compounds [A] and organoaluminum oxy-compounds [B] used may be the same as those mentioned previously.

The organoaluminum compounds [C] used herein may be those having in the molecule at least one Al-C bond, for example, the compounds as mentioned below.

That is, (i) organoaluminum compounds represented by the general formula $(R^1)_m Al(OR^2)_n H_p X_q$ wherein $R^1$ and $R^2$, which may be the same or different, are each hydrocarbon of usually 1 to 15 carbon atoms, preferably 1 to 10 carbon atoms, X is halogen, m is $1 \leq m \leq 3$, n is $0 \leq n \leq 2$, p is $0 \leq p \leq 2$, and q is $0 \leq q \leq 2$, and m+n+p+q=3, and (ii) alkylated complex compounds of metals of Group 1 of the periodic table and aluminum represented by the general formula $M^1 Al(R^1)_4$ wherein $M^1$ is Li, Na or K, and $R^1$ is defined above.

Of the organoaluminum compounds mentioned above, particularly preferred are those having hydrocarbon groups other than n-alkyl group. Hydrocarbon groups other than n-alkyl group may include alkyl having a branched chain such as isoalkyl, cycloalkyl and aryl. The organoaluminum compounds as illustrated above may include, for example, trialkylaluminum such as triisopropylaluminum, triisobutylaluminum, tri-2-methylbutylaluminum, tri-3-methylbutylaluminum, tri-2-methylpentylaluminum, tri-3-methypentylaluminum, tri-4-methylpentylaluminum, tri-2-methylhexylaluminum, tri-3-methylhexylaluminium and tri-2-ethylhexylaluminum; tricycloalkylaluminum such as tricyclohexylaluminum; triarylaluminum such as triphenylaluminum and tritolylaluminum; dialkylaluminum hydrides such as diisobutylaluminum hydride; and alkylaluminum alkoxides such as isobutylaluminum methoxide, isobutylaluminum ethoxide and isobutylaluminum isopropoxide. Of these organoaluminum compounds, preferred are those having branched alkyl groups, particularly trialkylaluminum compounds. Furthermore, isoprenylaluminum represented by the general formula $(i\text{-}C_5H_9)_x Al_y (C_5H_{10})_z$ wherein x, y and z are each a positive integer, and $z \geq 2x$, is also useful. Compounds capable of forming the above-mentioned organoaluminum compounds in the polymerization system, for example, halogenated aluminum and alkyl lithium, or halogenated aluminum and alkyl magnesium, may be added to the polymerization system.

In polymerizing olefin by using the first olefin polymerization catalysts of the present invention, the hafnium compound [A] is desirably used in an amount, in terms of hafnium atoms present in the polymerization reaction system, of $10^{-8} \sim 10^{-2}$ gram atom/l, preferably $10^{-7} \sim 10^{-3}$ gram atom/l, the organoaluminum oxy-compound [B] is desirably used in an amount, in terms of aluminum atoms present in the polymerization reaction system, of less than 3 mg atom/l, preferably 0.01~2 mg atom/l and especially 0.02~1 mg atom/l, and the organoaluminum compound [C] is desirably used in such an amount that the proportion of aluminum atoms derived from said organoaluminum compound [C] is the reaction system to the total aluminum atoms of the organoaluminum oxy-compound [B] and organoaluminum compound [C] is 20~99%, preferably 25~98% and especially 30~95%.

In the reaction system, the ratio of the total aluminum atom of the organoaluminum oxy-compound [B] and organoaluminum compound [C] to hafnium atoms of the hafnium compound [A] is usually 20~10000, preferably 50~5000 and especially 100~2000.

The olefin polymerization may be carried out by employing the same condition as used in the preparation of ethylene copolymers as aforesaid.

Hereinafter, the second olefin polymerization catalysts of the present invention are illustrated in detail.

The second olefin polymerization catalysts of the invention are formed from

[A] hafnium compounds having as ligands multidentate compounds in which at least two groups selected from among conjugated cycloalkadienyl groups or substituted groups thereof are linked together via lower alkylene groups,

[B-1] organoaluminum oxy-compounds formed from tri-n-alkylaluminum, and

[B-2] organoaluminum oxy-compounds in which at least one hydrocarbon group other than n-alkyl is linked to Al atom.

In the olefin polymerization catalysts mentioned above, the hafnium compounds [A] used are the same as those mentioned previously.

The catalyst components [B-1] used in the second olefin polymerization catalysts of the invention are organoaluminum oxy-compounds formed from tri-n-alkylaluminum.

n-alkyl group in the tri-n-alkylaluminum mentioned above includes methyl, ethyl, n-propyl, n-butyl, n-octyl and n-decyl. Among these, particularly preferred is methyl.

The catalyst components [B-2] used in the second olefin polymerization catalysts of the invention are organoaluminum oxy-compounds in which at least one hydrocarbon group other than n-alkyl is linked to Al atom.

The hydrocarbon group other than n-alkyl includes alkyl having branched chain such as isoalkyl, cycloalkyl and aryl.

The above-mentioned organoaluminum oxy-compounds [B-2] in which at least one hydrocarbon group other than n-alkyl is linked to Al atom may be formed from organoaluminum compounds in which at least one hydrocarbon group other than n-alkyl is linked to Al atom. Such organoaluminum compounds as used in the above case include, for example, trialkylaluminum such as triisopropylaluminum, triisobutylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum and tri-2-ethylhexylaluminum; tricycloalkylaluminum such as tricyclohexylaluminum; triarylaluminum such as triphenylaluminum and tritolylaluminum; trialkylaluminum hydrides such as diisobutylaluminum hydride; and alkylaluminum alkoxides such as isobutylaluminum methoxide, isobutylaluminum ethoxide and isobutylaluminum isopropoxide. Of these organoaluminum compounds, preferred are those having branched alkyl groups, particularly trialkylaluminum compounds. Furthermore, isoprenylaluminum represented by the general formula $(i-C_4H_9)_xAl_y(C_5H_{10})_z$ wherein x, y and z are each a positive integer, and $z \geq 2x$, is also useful.

In polymerization olefin by using the second olefin polymerization catalysts of the present invention, the hafnium compound [A] is desirably used in an amount, in terms of hafnium atoms present in the polymerization reaction system, of $10^{-8} \sim 10^{-2}$ gram atom/l, preferably $10^{-7} \sim 10^{-3}$ gram atom/l, the organoaluminum oxy-compound [B-1] in an amount, in terms of aluminum atoms in the polymerization reaction system, of less than 3 mg atom/l, preferably 0.01~2 mg atom/l and especially 0.02~1 mg atom/l, and the organoaluminum oxy-compound [B-2] in such an amount that the proportion of aluminum atoms derived from the organoaluminum oxy-compound [B-2] in the reaction system to the total aluminum atom of the organoaluminum oxy-compound [B-1] and organoaluminum oxy-compound [B-2] is 20~95%, preferably 25~90% and especially 30~85%.

In the reaction system, the ration of the total aluminum atom of the organoaluminum oxy-compound [B-1] and organoaluminum oxy-compound [B-2] to hafnium atoms of the hafnium compound [B] is usually 20~10000, preferably 50~5000 and especially 100~2000.

In that case, the olefin polymerization may be carried out by employing the same conditions as used in the preparation of ethylene copolymers as aforesaid.

EFFECT OF THE INVENTION

Novel ethylene copolymers of the present invention are small in $\overline{M}w/\overline{M}n$ and narrow in molecular weight distribution and, moreover, large in $MFR_{10}/MFR_2$ and excellent in flowability. Accordingly, the ethylene copolymers of the invention have excellent processability and are excellent in anti-blocking properties and the like properties.

Novel propylene copolymers of the invention are low in melting point in comparison with known propylene/α-olefin random copolymers even when said novel propylene copolymers are low in α-olefin content, and hence they have excellent anti-blocking properties and stiffness. In the present invention, there are also provided processes for preparing these novel copolymers mentioned above readily and efficiently.

The olefin polymerization catalysts of the invention exhibit high activities even when relatively small amounts of organoaluminum oxy-compounds are used therein, and by the use of said catalysts, olefin polymers large in molecular weight and narrow in molecular weight distribution and composition distribution are obtained.

The present invention is illustrated below with reference to examples, but it should be construed that the invention is in no way limited to those examples.

EXAMPLE 1 (PREPARATION OF ETHYLENE COPOLYMER)

(Preparation of methylaluminoxane)

Methylaluminoxane was prepared in accordance with the procedure described in Polymer Commun., 29, 180 (1988).
(Synthesis of ethylenebis(indenyl)hafnium dichloride)

A nitrogen-purged 200 ml glass flask was charged with 5.4 g of bis(indenyl)ethane [synthesized on the basis of Bull. Soc. Chim., 2954 (1967) ] and 50 ml of THF, and the flask was cooled with stirring to −30°~−40° C. To the flask was added dropwise 31.5 ml of n-Bu Li (1.6M solution), stirred successively at −30° C. for 1 hours, and the temperature was elevated spontaneously to room temperature, thereby anionizing the bis (indenyl)ethane. Separately, a nitrogen-purged 200 ml glass flask was charged with 60 ml of THF, and the flask was cooled to below −60° C., followed by gradual addition of 6.7 g of $HfCl_4$ (contained 0.78% by weight of zirconium atoms as contaminants). Thereafter, the flask was heated-up to 60° C. and stirred for 1 hour. To the flask was added dropwise the anionized ligand, and stirred at 60° C. for 2 hours, followed by filtration with a glass filter. The filtrate was concentrated at room temperature to about ⅕ of the original volume. By this operation, solids were separated. The separated solids were filtered with a glass filter, followed by washing with hexane/ethyl ether and vacuum drying to obtain ethylenebis(indenyl)hafnium dichloride.

The hafnium compound thus obtained contained 0.40% by weight of zirconium atoms.
(Polymerization)

A thoroughly nitrogen-purged 2 liter glass flask was charged with 950 ml of toluene and 50 ml of 1-octene, and ethylene gas was passed therethrough at a rate of 160 l/hr. The temperature in the system was elevated to 55° C., and 1.88 mmoles in terms of aluminum atom of methylaluminoxane and $7.5 \times 10^{-3}$ mmole of ethylenebis(indenyl)hafnium dichloride were added to the system to initiate polymerization. The polymerization was carried out at 60° C. for 10 minutes under atmospheric pressure while continuously feeding ethylene gas. The polymerization was stopped by the addition of small amounts of methanol, and the polymerization solution obtained was poured in large amounts of methanol to separate polymer. The separated polymer was dried at 130° C. for 12 hours under reduced pressure to obtain 23.2 g of a polymer having a density of 0.866 g/cm³, the ethylene content of 81.3 mol %, [η] of 1.71 dl/g, $\overline{M}w/\overline{M}n$ of 2.59, $MFR_2$ of 2.12 g/10 min and $MFR_{10}/MFR_2$ ratio of 13.1.

EXAMPLE 2

A thoroughly nitrogen-purged 2 liter glass flask was charged with 1 liter of toluene, and a mixed gas of ethylene and propylene (140 l/hr and 40 l/hr respectively) was passed therethrough. The temperature in the system was elevated to 75° C., and 1.88 mmoles in terms of aluminum atom of methylaluminoxane and $7.5 \times 10^{-3}$ mmol of ethylenebis(indenyl)hafnium dichloride were added to the system to initiate polymerization. The polymerization was carried out at 80° C. for 10 minutes under atmospheric pressure while continuously feeding the above-mentioned mixed gas to the system. Thereafter, the operation was conducted in the same manner as in Example 1 to obtain 17.5 g of a polymer having a density of 0.887 g/cm$^3$, the ethylene content of 84.0 mol %, [η] of 1.50 dl/g, $\overline{M}w/\overline{M}n$ of 2.50, $MFR_2$ of 0.80 g/10 min and $MFR_{10}/MFR_2$ ratio of 12.7.

Comparative Example 1

A copolymer of ethylene and propylene (prepared by using a catalyst composed of $VOCl_3$ and aluminum ethyl sesquichloride) having a density of 0.87 g/cm$^3$, $MFR_2$ of 2.9 g/10 min and $\overline{M}w/\overline{M}n$ of 2.16 was found to have $MFR_{10}/MFR_2$ ratio of 5.90.

EXAMPLE 3

(Preparation of hafnium catalyst)

A glass column of 35 mm in inside diameter was filled with a suspension in toluene of 40 g of dimethylsilylated silica gel (Art. 7719, a product of MERCK) deaerated at room temperature for 4 hours. Subsequently, 200 ml of the toluene solution (Hf=2.07 mmol/l) of ethylenebis(indenyl)hafnium dichloride prepared in Example 1 was gradually poured into the column. A hafnium solution (Hf=0.17 m mol/l) eluted by this operation was used as a catalyst component.
(Polymerization)

The polymerization was carried out in the same manner as in Example 1 except that the polymerization was carried out at 70° C. for 35 minutes using 6.6×10$^{-3}$ mg atom of hafnium atom, to obtain 42.4 g of a colorless transparent polymer having a density of 0.855 g/cm$^3$, the ethylene content of 76.2 mol %, [η] of 1.89 dl/g, $\overline{M}w/\overline{M}n$ of 2.48, $MFR_2$ of 1.49 g/10 min and $MFR_{10}/MFR_2$ ratio of 10.1.

EXAMPLE 4

The polymerization was carried out in the same manner as in Example 2 except that the hafnium catalyst component prepared in Example 3 was used in an amount of 6.6×10$^{-3}$ mg atom in terms of hafnium atom to obtain 17.0 g of a colorless transparent polymer having a density of 0.883 g/cm$^3$, the ethylene content of 83.5 mol %, [η] of 1.61 dl/g, $\overline{M}w/\overline{M}n$ of 2.54, $MFR_2$ of 0.73 g/10 min, and $MFR_{10}/MFR_2$ ratio of 12.2.

EXAMPLE 5

The polymerization was carried out in the same manner as in Example 1 except that the polymerization temperature employed was 40° C. and the polymerization the employed was 15 minutes to obtain 20.5 g of a polymer having a density of 0.868 g/cm$^3$, the ethylene content of 82.0 mol %, [η] of 1.79 dl/g, $\overline{M}w/\overline{M}n$ of 2.81, $MFR_2$ of 0.90 g/10 min and $MFR_{10}/MFR_2$ ratio of 32.0.

EXAMPLE 6 (PREPARATION OF PROPYLENE COPOLYMER)

(Polymerization)

A thoroughly nitrogen-purged 2 liter stainless steel autoclave was charged at room temperature with 500 ml of toluene, 3 moles of propylene, 0.1 mole of 1-butene and 5 mg atom in terms of Al atom of methylaluminoxane. The temperature in the polymerization system was elevated to 45° C., and 1.25×10$^{-3}$ mmole of the ethylenebis(indenyl)hafnium dichloride obtained in Example 1 was added to the system to carry out polymerization at 50° C. for 0.5 hours. The polymerization was stopped by the addition of methanol to the polymerization system.

The polymer slurry obtained was poured into large amounts of methanol, the slurry was recovered by filtration and washed with an isobutyl alcohol/hydrochloric acid solution to remove the catalyst components therefrom. The recovered slurry was then vacuum dried overnight at 80° C. and 200~300 mmHg to obtain 27.5 g of a polymer having the 1-butene content of 2.2 mol %, [η] of 3.02 dl/g as measured in decalin at 135° C., a melting point of 124° C. as measured by DSC, a boiling trichloroethylene-insoluble content of 0% by weight, boiling n-pentane-soluble content of 0.3% by weight and $\overline{M}w/\overline{M}n$ of 2.41 as measured by GPC.

EXAMPLE 7

The polymerization was carried out in the same manner as in Example 6 except that the amount of 1-butene charged was changed to 0.25 mol to obtain 29.1 g of a polymer having the 1-butene content of 5.6 mol %, [η] of 2.95 dl/g, a melting point of 116° C., a boiling trichloroethylene-insoluble content of 0% by weight, a boiling n-pentane-soluble content of 0.4% by weight and $\overline{M}w/\overline{M}n$ of 2.33.

EXAMPLE 8

(Polymerization)

A mixed gas composed of 96.7 mol % of propylene, 2.1 mol % of 1-butene and 1.2 mol % of ethylene was prepared.

A thoroughly nitrogen-purged 2 liter stainless steel autoclave was charged with 500 ml of toluene and then cooled to 0° C., and the autoclave was further charged with 3 moles of the mixed gas prepared above and 5 mg atom in terms of Al atom of methylaluminoxane. The temperature in the polymerization system was elevated to 45° C., and 1.25×10$^{-3}$ m mole of the ethylenebis(indenyl)hafnium dichloride obtained in Example 1 was added to the system to initiate polymerization at 50° C. for 0.5 hours. The polymerization was stopped by the addition of methanol to the polymerization system. The polymer slurry obtained was poured into large amounts of methanol, the slurry was recovered by filtration and washed with an isobutyl alcohol/hydrochloric acid solution to remove the catalyst components therefrom. The recovered polymer was then vacuum dried overnight at 80° C. and 200~300 mmHg to obtain 51.3 g of a polymer having the 1-butene content of 1.4 mol %, the ethylene content of 1.1 mol %, [η] of 3.32 dl/g as measured in decalin at 135° C., a melting point of 121° C. as measured by DSC, a boiling trichloroethylene-insoluble content of 0% by weight, boiling n-pentane-soluble content of 0.9% by weight and $\overline{M}w/\overline{M}n$ of 2.45 as measured by GPC.

EXAMPLE 9

The polymerization was carried out in the same manner as in Example 8 except that the mixed gas composed of 95.1 mol % of propylene, 3.9 mol % of 1-butene and 1.0 mol % of ethylene was used to obtain 48.5 g of a polymer having the 1-butene content of 2.7 mol %, the ethylene content of 0.8 mol %, [η] of 3.29 dl/g, a melting point of 118° C., a boiling trichloroethylene-insoluble content of 0% by weight, a boiling n-pentane-soluble content of 1.1% by weight and $\overline{M}w/\overline{M}n$ of 2.40.

EXAMPLE 10

(Polymerization)

A thoroughly nitrogen-purged 2 liter stainless steel autoclave was charged with 750 ml of toluene and then saturated with propylene gas. To the autoclave were added 7.5 mg atom in terms of Al atom of methylaluminoxane and $1.88 \times 10^{-3}$ mmole of the ethylenebis(indenyl)hafnium dichloride. Polymerization was carried out at 50° C. for 0.5 hour at the total pressure of 7 kg/cm$^2$ G while continuously feeding propylene gas to the autoclave. The polymerization was stopped by the addition of methanol to the polymerization system. The polymer slurry obtained was poured into large amounts of methanol, the slurry was recovered by filtration and washed with an isobutyl alcohol/hydrochloric acid solution to remove the catalyst components therefrom. The recovered slurry was then vacuum dried overnight at 80° C. and 200~300 mmHg to obtain 107.1 g of an isotactic polypropylene having $\overline{Mw}/\overline{Mn}$ of 1.89 as measured by GPC, a melting point of 132° C. as measured by DSC, [η] of 2.82 dl/g as measured in decalin at 135° C., a boiling trichloroethylene-insoluble content of 0% by weight and a boiling n-pentane-soluble content of 0.2% by weight.

EXAMPLE 11

A mixed gas composing 98.5 mol % of propylene gas and 1.5 mol % of ethylene gas was prepared. The operation subsequent thereto was carried out in the same manner as in Example 6 to obtain 53.3 g of a polymer having the ethylene content of 1.3 mol %, [η] of 3.50 dl/g, a melting point of 125° C., a boiling trichloroethylene-insoluble content of 0% by weight, a boiling n-pentane-soluble content of 1.0% by weight and $\overline{Mw}/\overline{Mn}$ of 2.39.

Evaluation

Heat-sealing properties of the propylene polymers obtained hereinabove were evaluated in the following manner.

Preparation of film

Figure 3:
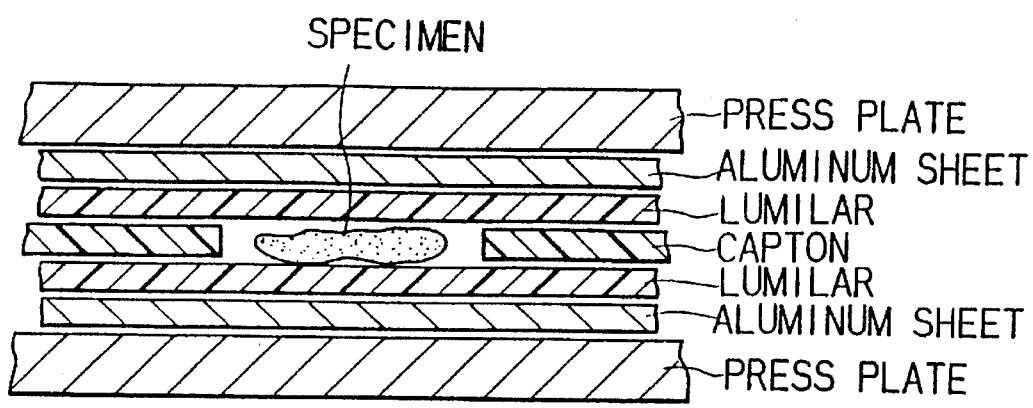
FIGS. 3–5 are stepwise illustrative of the method of evaluation of heat-sealing properties of the propylene random copolymer of the present invention.

On a press plate were placed an aluminum sheet of a 0.1 mm thick, a polyester sheet (a product sold under a trade name of Rumiler by Toray) and a polyimide resin sheet (a product sold under a trade name of Capton by Du Pont), a square of 15 cm×15 cm of the center of which had been cut off, in that order, and 0.8 g of the specimen was placed in this center (the cut-off portion of the polyimide resin sheet), and then Rumiler®, an aluminum sheet and a press plate were superposed thereon in that order (see FIG. 3).

The specimen thus interposed between the press plates was placed in a hot press kept at 200° C. and preheated for about 5 minutes, followed by subjecting three times to pressure application (20 kg/cm$^2$ G) and release operation in order to remove air bubbles present in the specimen. Subsequently, the pressure was increased finally to 150 kg/cm$^2$ G and the specimen was heated for 5 minutes under pressure. After releasing the pressure, the press plate was taken out from a press machine and transferred to separate press machine kept at 30° C. in its press in portion and then cooled for 4 minutes at a pressure of 100 kg/cm$^2$, followed by releasing the pressure and taking out the specimen therefrom. Of the films thus obtained, those having a uniform thickness of 50~70 μm were used as the films for measurement.

Measurement of heat-sealing strength

The films thus prepared are placed for 2 days in a hygrostat kept at 50° C. (aging). In practicing the aging, sheets of paper are applied to both sides of the film so that the films do not come in contact with each other. The films thus aged are cut up into strips of a 15 mm thick, and two sheets of the strip are placed one upon another and then interposed between two sheets of Teflon Film of a 0.1 mm thick, followed by heat sealing. The heat sealing is carried out while maintaining the temperature of a lower portion of a hot plate of heat sealer constant at 70° C. and varying only the temperature of an upper portion of hot plate suitably at intervals of 5° C. The heat-sealing pressure employed is 2 kg/cm$^2$, the heat-sealing the employed is 1 second, and a width of heat seal is 5 mm (accordingly a sealed area is 15 mm×5 mm).

Figure 4:
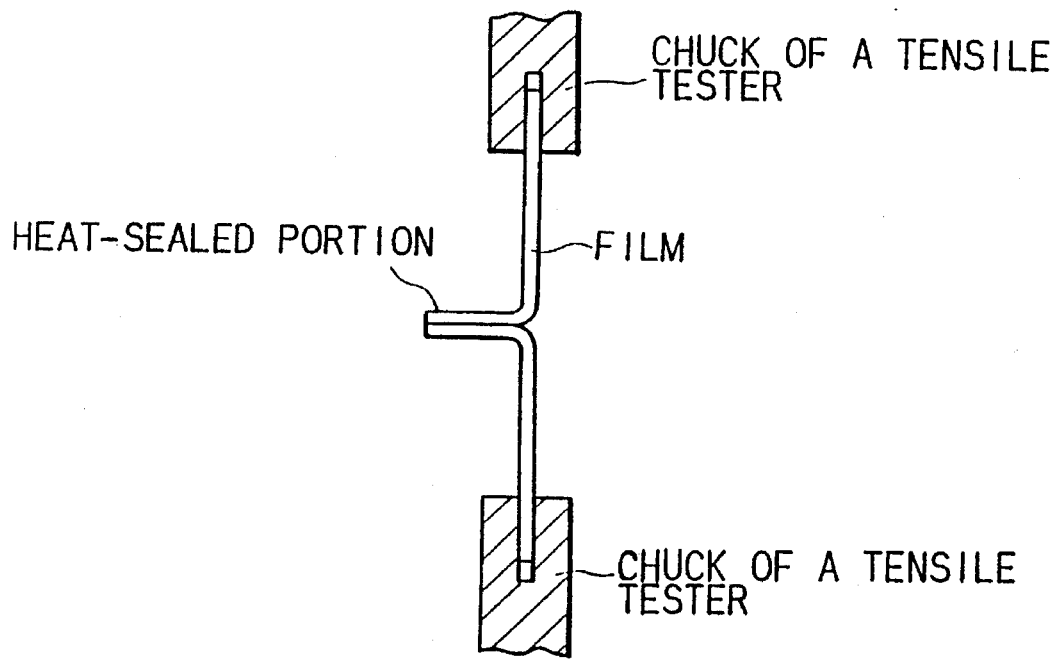

Heat-sealing strength is determined by obtaining a peeling strength of the heat sealed film subjected to peeling test at a rate of 30 cm/min at each heat-sealing temperature as mentioned above. (See FIG. 4.)

Figure 5:
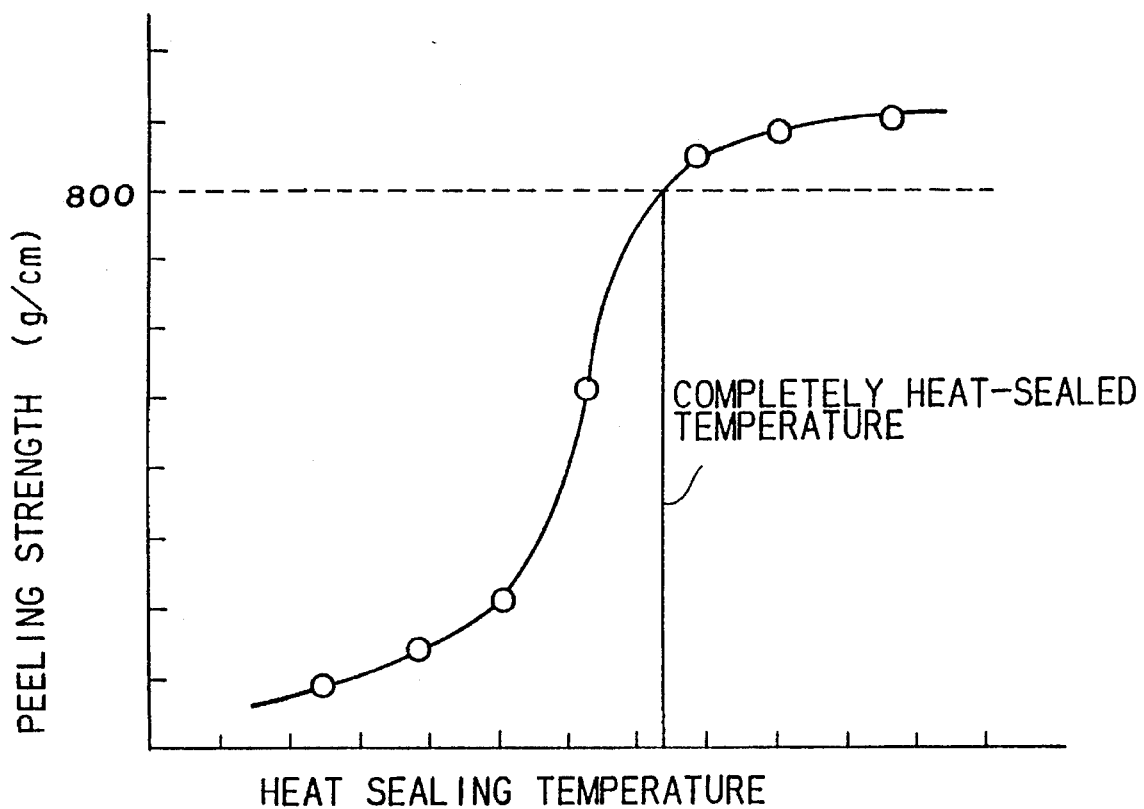

Following the above-mentioned procedure, a peeling strength at each of the heat-sealing temperatures preset at interval of 5° C. is obtained, and the plots of heat-sealing temperature-peeling strength are connected by means of a curved line. On the basis of the curved line, a heat sealing temperature corresponding to a peeling strength of 800 g/15 mm is taken as a completely heat-sealed temperature (see FIG. 5).

Table 1 below shows completely heat-sealed temperatures of the propylene polymers obtained in the foregoing examples.

TABLE 1

| Example | 6 | 7 | 8 | 9 | 10 | 11 |
|---|---|---|---|---|---|---|
| Completely heat-sealed temperature (°C.) | 134 | 125 | 117 | 122 | 120 | 127 |

EXAMPLE 12

(Preparation of organoaluminum oxy-compound [B-1])

A thoroughly nitrogen-purged 400 ml flask was charged with 37 g of Al$_2$(SO$_4$)$_3$.14H$_2$O and 125 ml of toluene and cooled to 0° C., followed by dropwise addition of 500 mmol of trimethylaluminum diluted with 125 ml of toluene. The temperature of the flask was elevated to 40° C., and reaction was continued at that temperature for 10 hours. After the completion of the reaction, solid-liquid separation of the reaction mixture was effected by filtration, and the toluene was removed from the filtrate to obtain 13 g of a white solid organoaluminum oxy-compound. The molecular weight of the compound obtained was 930 as measured in benzene by the cryoscopic method, and m value shown in the catalyst component [B-1] was 14.

(Polymerization)

A thoroughly nitrogen-purged 2 liter stainless steel autoclave was charged with 500 ml of toluene, and the system was purged with propylene gas. Successively, to the autoclave were added 1 mmol of triisobutylaluminum, 1 mg atom in terms of Al atom of the organoaluminum oxy-compound obtained above, and $1\times10^{-3}$ mmol of the ethylenebis(indenyl)hafnium dichloride obtained in Example 1, and the temperature of the system was elevated to 45° C. Thereafter, polymerization was carried out at 50° C. for 1 hours, while feeding propylene gas to the polymerization system so that the total pressure became 7 kg/cm$^2$ G, to obtain 45.0 g of an isotactic polypropylene having [η] of 2.5 dl/g as measured in decalin at 135° C., $\overline{Mw}/\overline{Mn}$ of 2.2, a melting point of 132° C., a boiling trichloroethylene-insoluble content of 0% by weight and a boiling n-pentane-soluble content of 0.2% by weight.

Comparative Example 2

The polymerization of Example 12 was repeated except that the triisobutylaluminum was not used to obtain 5.1 g of isotactic polypropylene having [η] of 1.9 dl/g, $\overline{Mw}/\overline{Mn}$ of 2.1 and a melting point of 131° C.

EXAMPLE 13

The polymerization of Example 12 was repeated except that in place of the triisobutylaluminum there were used 1 m mol of tri-2-ethylhexylaluminum and 0.5 mg atom in terms of Al atom of commercially available aluminoxane to obtain 38.2 g of isotactic polypropylene having [η] of 2.3 dl/g, $\overline{Mw}/\overline{Mn}$ of 2.4, a melting point of 131° C., a boiling trichloroethylene-insoluble content of 0% by weight and a boiling n-pentane-soluble content of 0.3% by weight.

EXAMPLE 14

A nitrogen-purged 1 liter glass autoclave was charged with 335 ml of toluene and 15 ml of octene, followed by elevating the temperature of the system to 70° C. while blowing ethylene gas thereinto. Successively, to the autoclave were added 0.4 mmol of triisobutylaluminum, 0.2 mg atom in terms of Al atom of commercially available aluminoxane and 3×10⁻³ mmol of the ethylenebis(indenyl)hafnium dichloride obtained in Example 1 to initiate polymerization. The polymerization was carried out at 70° C. for 30 minutes while continuously feeding ethylene gas to the polymerization system to obtain 16.8 g of an ethylene/1-octene copolymer having $\overline{Mw}/\overline{Mn}$ of 3.18, $MFR_2$ of 0.09 g/10 min, $MFR_{10}/MFR_2$ of 30.7 and a density of 0.879 g/cm³.

EXAMPLE 15

(Preparation of organoaluminum oxy-compound [B-2])

A thoroughly nitrogen-purged 400 ml flask was charged with 4.9 g of $Al_2(SO_4)_3 \cdot 14H_2O$ and 125 ml of toluene and cooled to 0° C., followed by dropwise addition of 200 mmol of triisobutylaluminum diluted with 125 ml of toluene. The temperature of the reaction system was elevated to 40° C., and reaction was continued at that temperature for 24 hours. After the completion of the reaction, solid-liquid separation of the reaction mixture was conducted by filtration, the toluene was removed from the filtrate, and a molecular weight of the organoaluminum oxy-compound [B-2] obtained was measured in benzene by the cryoscopic method to find that it was 610.

(Polymerization)

A thoroughly nitrogen-purged 2 liter stainless steel autoclave was charged with 500 ml of toluene, and the system was then purged with propylene gas. Successively, to the autoclave were added 1 mg atom each in terms of Al atom of the organoaluminum oxy-compound [B-1] and the organoaluminum oxy-compound [B-2] and 1.0×10⁻³ mmol of ethylenebis(indenyl)hafnium dichloride, and the temperature of the polymerization system was elevated to 30° C. Thereafter, polymerization was carried out at 30° C. for 20 minutes while feeding propylene gas to the total pressure became 5 kg/cm² G to obtain 9.5 g of isotactic polypropylene having [η] of 4.1 dl/g, $\overline{Mw}/\overline{Mn}$ of 3.5, a melting point of 135° C., a boiling trichloroethylene-insoluble content of 0% by weight and a boiling n-pentane-soluble content of 0.2% by weight.

EXAMPLE 16

Example 12 was repeated except that the polymerization was carried out under the total pressure of 7 kg/cm² G at 50° C. for 1 hours using 1 mg atom in terms of Al atom of $(iso-C_4H_9)_2Al-O-Al(iso-C_4H_9)_2$ as the organoaluminum oxy-compound [B-2] and 0.5 mg atom in terms of Al atom of the organoaluminum oxy-compound [B-1] to obtain 35.1 g of isotactic polypropylene having [η] of 2.2 dl/g, Mw/Mn of 2.1, a melting point of 132° C., a boiling trichloroethylene-insoluble content of 0% by weight and a boiling n-pentane-soluble content of 0.3% by weight.

Comparative Example 3

Example 16 was repeated except that the organoaluminum oxy-compound [B-2] was not used to obtain 2.4 g of isotactic polypropylene having [η] of 1.5 dl/g and a melting point of 130° C.

EXAMPLE 17

A thoroughly nitrogen-purged 1 liter glass autoclave was charged with 328 ml of toluene and 22 ml of 1-octene, and the system was then elevated in temperature to 70° C. while blowing ethylene gas thereinto. Successively, to the autoclave were added 0.4 mg atom in terms of Al atom of

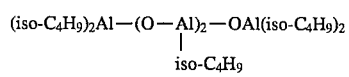

as the organoaluminum oxy-compound [B-2], 0.2 mg atom in terms of Al atom of the above-mentioned organoaluminum oxy-compound [B-1] and 3×10⁻³ mmol of ethylenebis(indenyl)hafnium dichloride to initiate polymerization. The polymerization was carried out at 70° C. for 30 minutes while continuously feeding ethylene gas to the polymerization system to obtain 12.3 g of an ethylene/1-octene copolymer having $\overline{Mw}/\overline{Mn}$ of 2.49, $MFR_2$ of 7.2 g/10 min, $MFR_{10}/MFR_2$ of 9.3 and a density of 0.853 g/cm³.

What is claimed is:

1. A process for preparing ethylene copolymers which comprises copolymerizing ethylene and α-olefin of 3 to 20 carbon atoms at a pressure of from atmospheric pressure to 50 kg/cm² in the presence of a catalyst so that the resulting copolymer has a density of 0.85 to 0.92 g/cm³, and $MFR_{10}/MFR_2$ ratio wherein $MFR_{10}$ is the melt flow rate under a load 10 kg at 19° C. and $MFR_2$ is the melt flow rate under a load of 2 kg at 190° C. of 8 to 50;

wherein said catalyst comprises (A) a hafnium compound having a multidentate ligand in which at least two groups selected from the group consisting of indenyl groups and substituted indenyl groups are linked together via a lower alkylene group having 1 to 4 carbon atoms or hafnium compounds obtained by treating the above-mentioned hafnium compounds with alkylsilylated silica gel, and (B) an organoaluminum oxy-compound, and the copolymerization is carried out in the presence of the hafnium compound (A) at a concentration, in terms of hafnium atom, of from 10⁻⁸ to 10⁻² gram atom per liter, and the organoaluminum oxy-compound at a concentration, in terms of aluminum atom of from 1×10⁻⁴ to 1×10⁻¹ gram atom per liter.

2. The process of claim 1 wherein the lower alkylene linking group in the hafnium compound is ethylene.

3. A process for preparing ethylene copolymers which comprises copolymerizing ethylene and α-olefin of 3 to 20 carbon atoms at a pressure of from atmospheric pressure to 50 kg/cm² in the presence of a catalyst so that the resulting copolymer has a density of 0.85 to 0.92 g/cm$^2$, a ratio (Mw/Mn) of weight average molecular weight (Mw) to number average molecular weight (Mn) as measured by gel permeation chromatography of 1.2 to 4, and MFR$_{10}$/MFR$_2$ ratio wherein MFR$_{10}$ is the melt flow rate under a load of 10 kg at 190° C. and MFR$_2$ is the melt flow rate under a load of 2 kg at 190° C. of 8 to 50;

wherein said catalyst comprises (A) a hafnium compound having a multidentate ligand in which at least two groups selected from the group consisting of indenyl groups and substituted indenyl groups are linked together via a lower alkylene group having 1 to 4 carbon atoms or hafnium compounds obtained by treating the above-mentioned hafnium compounds with alkylsilylated silica gel, and (B) an organoaluminum oxy-compound, and the copolymerization is carried out in the presence of the hafnium compound (A) at a concentration, in terms of hafnium atom, of from $10^{-8}$ to $10^{-2}$ gram atom per liter, and the organoaluminum oxy-compound at a concentration, in terms of aluminum atom, of from $1\times10^{-4}$ to $1\times10^{-1}$ gram atom per liter.

4. The process of claim 3 wherein the lower alkylene linking group in the hafnium compound is ethylene.

5. A process for preparing ethylene copolymers which comprises copolymerizing ethylene and α-olefin of 3 to 20 carbon atoms at a pressure of from atmospheric pressure to 50 kg/cm$^3$ in the presence of a catalyst so that the resulting copolymer has a density of 0.85 to 0.92 g/cm$^3$, a ratio (Mw/Mn) of a weight average molecular weight (Mw) to a number average molecular weight (Mn) as measured by gel permeation chromatography of 1.2 to 4, and MFR$_{10}$/MFR$_2$ ratio wherein MFR$_{10}$ is the melt flow rate under a load 10 kg at 190° C. and MFR$_2$ is the melt flow rate under a load of 2 kg at 190° C. of 8 to 50;

wherein said catalyst comprises (A) a hafnium compound having a multidentate ligand in which at least two groups selected from the group consisting of indenyl groups and substituted indenyl groups are linked together via a lower alkylene group having 1 to 4 carbon atoms or hafnium compounds obtained by treating the above-mentioned hafnium compounds with alkylsilylated silica gel, and (B) an organoaluminum oxy-compound, and the copolymerization is carried out in the presence of the hafnium compound (A) at a concentration, in terms of hafnium atom, of from $10^{-8}$ to $10^{-2}$ gram atom per liter, and the organoaluminum oxy-compound (B) at a concentration, in terms of aluminum atom, of from $5\times10^{-4}$ to $5\times10^{-2}$ gram atom per liter.

6. The process of claim 5 wherein the lower alkylene linking group in the hafnium compound is ethylene.

7. A process for preparing ethylene copolymers which comprises copolymerizing ethylene and α-olefin of 3 to 20 carbon atoms in the presence of a catalyst so that the resulting copolymer has a density of 0.85 to 0.92 g/cm$^3$, and MFR$_{10}$/MFR$_2$ ratio wherein MFR$_{10}$ is the melt flow rate under a load 10 kg at 190° C. and MFR$_2$ is the melt flow rate under a load of 2 kg at 190° C. of 8 to 50;

wherein said catalyst comprises (A) a hafnium compound having a multidentate ligand in which at least two groups selected from the group consisting of indenyl group, 4,5,6,7-tetrahydro-1-indenyl group, methyl-indenyl group and methoxy-indenyl group are linked together via ethylene group, and (B) an organoaluminum oxy-compound, and the copolymerization is carried out in the presence of the hafnium compound (A) at a concentration, in terms of hafnium atom, of from $10^{-8}$ to $10^{-2}$ gram atom per liter, and the organoaluminum oxy-compound (B) at a concentration, in terms of aluminum atom, of from $1\times10^{-4}$ to $1\times10^{-1}$ gram atom per liter.

8. A process for preparing ethylene copolymers which comprises copolymerizing ethylene and α-olefin of 3 to 20 carbon atoms in the presence of a catalyst so that the resulting copolymer has a density of 0.85 to 0.92 g/cm$^3$, a ratio (Mw/Mn) of a weight average molecular weight (Mw) to a number average molecular weight (Mn) as measured by gel permeation chromatography of 1.2 to 4, and MFR$_{10}$/MFR$_2$ ratio wherein MFR$_{10}$ is the melt flow rate under a load 10 kg at 190° C. and MFR$_2$ is the melt flow rate under a load of 2 kg at 190° C. of 8 to 50;

wherein said catalyst comprises (A) a hafnium compound having a multidentate ligand in which at least two groups selected from the group consisting of indenyl group, 4,5,6,7-tetrahydro-1-indenyl group, methyl-indenyl group and methoxy-indenyl group are linked together via ethylene group, and (B) an organoaluminum oxy-compound, and the copolymerization is carried out in the presence of the hafnium compound (A) at a concentration, in terms of hafnium atom, of from $10^{-8}$ to $10^{-2}$ gram atom per liter, and the organoaluminum oxy-compound (B) at a concentration, in terms of aluminum atom, of from $1\times10^{-4}$ to $1\times10^{-1}$ gram atom per liter.

9. A process for preparing ethylene copolymers which comprises copolymerizing ethylene and α-olefin of 3 to 20 carbon atoms in the presence of a catalyst so that the resulting copolymer has a density of 0.85 to 0.92 g/cm$^3$, and MFR$_{10}$/MFR$_2$ ratio wherein MFR$_{10}$ is the melt flow rate under a load 10 kg at 190° C. and MFR$_2$ is the melt flow rate under a load of 2 kg at 190° C. of 8 to 50;

wherein said catalyst comprises (A) a hafnium compound having a multidentate ligand in which at least two groups selected from the group consisting of indenyl group, 4,5,6,7-tetrahydro-1-indenyl group, methyl-indenyl group and methoxy-indenyl group are linked together via ethylene group, and (B) an organoaluminum oxy-compound, and the copolymerization is carried out in the presence of the hafnium compound (A) at a concentration, in terms of hafnium atom, of from $10^{-8}$ to $10^{-2}$ gram atom per liter, and the organoaluminum oxy-compound at a concentration, in terms of aluminum atom, of from $5\times10^{-4}$ to $5\times10^{-2}$ gram atom per liter.

10. A process for preparing ethylene copolymers which comprises copolymerizing ethylene and α-olefin of 3 to 20 carbon atoms in the presence of a catalyst so that the resulting copolymer has a density of 0.85 to 0.92 g/cm$^3$, a ratio (Mw/Mn) of a weight average molecular weight (Mw) to a number average molecular weight (Mn) as measured by gel permeation chromatography of 1.2 to 4, and $MFR_{10}/MFR_2$ ratio wherein $MFR_{10}$ is the melt flow rate under a load 10 kg at 190° C. and $MFR_2$ is the melt flow rate under a load of 2 kg at 190° C. of 8 to 50;

wherein said catalyst comprises (A) a hafnium compound having a multidentate ligand in which at least two groups selected from the group consisting of indenyl group, 4,5,6,7-tetrahydro-1-indenyl group, methyl-idenyl group and methoxy-idenyl group are linked together via ethylene group, and (B) an organoaluminum oxy-compound, and the copolymerization is carried out in the presence of the hafnium compound (A) at a concentration, in terms of hafnium atom, of from $10^{-8}$ to $10^{-2}$ gram atom per liter, and the organoaluminum oxy-compound (B) at a concentration, in terms of aluminum atom, of from $5 \times 10^{-4}$ to $5 \times 10^{-2}$ gram atom per liter.

11. A process for preparing ethylene copolymers which comprises copolymerizing ethylene and α-olefin of 3 to 20 carbon atoms at a temperature of 0° to 120° C. and a pressure of from atmospheric pressure to 50 kg/cm³ in the presence of a catalyst so that the resulting copolymer has a density of 0.85 to 0.92 g/cm³, structural units (a) derived from ethylene in an amount of 65 to 95 mol % and structural units (b) derived from α-olefin in an amount of 5 to 35 mol %, a ratio (Mw/Mn) of a weight average molecular weight (Mw) to a number average molecular weight (Mn) as measured by gel permeation chromatography of 1.2 to 4, and $MFR_{10}/MFR_2$ ratio wherein $MFR_{10}$ is the melt flow rate under a load 10 kg at 190° C. and $MFR_2$ is the melt flow rate under a load of 2 kg at 190° C. of 8 to 50;

wherein said catalyst comprises (A) a hafnium compound having a multidentate ligand in which at least two groups selected from the group consisting of indenyl group, 4,5,6,7-tetrahydro-1-indenyl group, methyl-indenyl group and methoxy-indenyl group are linked together via ethylene group, and (B) an organoaluminum oxy-compound, and the copolymerization is carried out in the presence of the hafnium compound (a) at a concentration, in terms of hafnium atom, of from $10^{-7}$ to $10^{-3}$ gram atom per liter, and an organoaluminum oxy-compound at a concentration, in terms of aluminum atom, of from $5 \times 10^{-4}$ to $5 \times 10^{-2}$ gram atom per liter.

* * * * *